(12) United States Patent
Kondou et al.

(10) Patent No.: US 12,382,207 B2
(45) Date of Patent: Aug. 5, 2025

(54) SYNCHRONIZATION DEVICE AND SYNCHRONIZATION METHOD

(71) Applicant: SONY SEMICONDUCTOR SOLUTIONS CORPORATION, Kanagawa (JP)

(72) Inventors: Masato Kondou, Kanagawa (JP); Takuya Okamoto, Kanagawa (JP); Fumitaka Kondo, Kanagawa (JP); Michito Ishii, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 438 days.

(21) Appl. No.: 17/785,630

(22) PCT Filed: Dec. 3, 2020

(86) PCT No.: PCT/JP2020/045102
§ 371 (c)(1),
(2) Date: Jun. 15, 2022

(87) PCT Pub. No.: WO2021/131582
PCT Pub. Date: Jul. 1, 2021

(65) Prior Publication Data
US 2023/0048782 A1 Feb. 16, 2023

(30) Foreign Application Priority Data
Dec. 25, 2019 (JP) .................. 2019-235151

(51) Int. Cl.
*H04R 5/033* (2006.01)
*H04R 1/10* (2006.01)
*H04S 1/00* (2006.01)

(52) U.S. Cl.
CPC ........... *H04R 1/1041* (2013.01); *H04R 5/033* (2013.01); *H04S 1/007* (2013.01); *H04R 2420/07* (2013.01)

(58) Field of Classification Search
CPC ........ H04R 1/10; H04R 1/1041; H04R 5/033; H04R 2420/07; H04S 1/00; H04S 1/007; H04N 21/242
See application file for complete search history.

(56) References Cited

U.S. PATENT DOCUMENTS

| 5,185,680 A * | 2/1993 | Kakubo | G11B 27/323 |
| 6,982,994 B2 * | 1/2006 | Shimosakoda | H04J 3/0697 370/520 |

(Continued)

FOREIGN PATENT DOCUMENTS

| EP | 3340702 A1 | 5/2019 |
| EP | 3487185 A1 | 5/2019 |

(Continued)

OTHER PUBLICATIONS

International Search Report and Written Opinion of PCT Application No. PCT/JP2020/045102, issued on Mar. 9, 2021, 09 pages of ISRWO.

*Primary Examiner* — Hai V Nguyen
(74) *Attorney, Agent, or Firm* — CHIP LAW GROUP

(57) ABSTRACT

Provided is a synchronization device that synchronizes time-series data between a master and a slave by wireless communication, the master including a packet transmission unit that transmits a plurality of packets at a predetermined interval, and the slave including a synchronization unit that synchronizes time-series data transmitted by the master and time-series data received by the slave on the basis of the interval between the plurality of packets.

25 Claims, 21 Drawing Sheets

(56) References Cited

U.S. PATENT DOCUMENTS

| | | | | |
|---|---|---|---|---|
| 7,570,664 | B2* | 8/2009 | Shimosakoda | H04B 1/7183 |
| | | | | 375/365 |
| 7,620,075 | B2* | 11/2009 | Ishimoto | H04L 25/05 |
| | | | | 370/252 |
| 9,002,044 | B2* | 4/2015 | Dinescu | H04R 5/033 |
| | | | | 381/311 |
| 9,009,518 | B2* | 4/2015 | Heinrich | H04N 21/242 |
| | | | | 327/160 |
| 9,478,200 | B2* | 10/2016 | Maezawa | G10H 1/0066 |
| 9,674,480 | B2* | 6/2017 | Chiba | H04N 9/8211 |
| 9,705,663 | B2* | 7/2017 | Kang | H02J 7/00036 |
| 9,904,508 | B1* | 2/2018 | Drinkwater | H04L 65/61 |
| 10,757,484 | B2* | 8/2020 | Pelletier | G08C 19/16 |
| 10,805,731 | B2* | 10/2020 | Gong | H04R 1/1041 |
| 10,859,689 | B2* | 12/2020 | Knaappila | G01S 11/04 |
| 11,251,659 | B2* | 2/2022 | Kim | H02J 7/02 |
| 11,303,989 | B2* | 4/2022 | Gong | H04L 65/1086 |
| 11,323,889 | B2* | 5/2022 | Högberg | H04W 16/14 |
| 11,405,880 | B2* | 8/2022 | Chang | H04W 4/80 |
| 11,452,172 | B2* | 9/2022 | Gong | H04M 1/6066 |
| 11,659,305 | B2* | 5/2023 | Pelletier | H04Q 5/14 |
| | | | | 370/392 |
| 11,696,228 | B2* | 7/2023 | Pelletier | H04W 52/0212 |
| | | | | 370/311 |
| 11,937,200 | B2* | 3/2024 | Li | H04W 56/005 |
| 2001/0046241 | A1* | 11/2001 | Shimosakoda | H04L 7/042 |
| | | | | 370/509 |
| 2003/0177272 | A1* | 9/2003 | Shimosakoda | H04B 1/7183 |
| | | | | 709/248 |
| 2007/0226530 | A1* | 9/2007 | Celinski | H04J 3/0664 |
| | | | | 713/500 |
| 2007/0291887 | A1* | 12/2007 | Ishimoto | H04L 25/40 |
| | | | | 375/371 |
| 2009/0313310 | A1* | 12/2009 | Thome | H04W 84/18 |
| | | | | 707/999.203 |
| 2010/0179673 | A1* | 7/2010 | Muroi | G11B 27/10 |
| | | | | 710/110 |
| 2012/0230510 | A1* | 9/2012 | Dinescu | H04R 5/033 |
| | | | | 381/80 |
| 2015/0287419 | A1* | 10/2015 | Chen | H04R 3/12 |
| | | | | 704/500 |
| 2016/0098977 | A1* | 4/2016 | Maezawa | G10G 1/00 |
| | | | | 84/602 |
| 2016/0100125 | A1* | 4/2016 | Chiba | H04N 5/77 |
| | | | | 386/210 |
| 2017/0286051 | A1* | 10/2017 | Mendes | H04N 21/8106 |
| 2018/0020308 | A1* | 1/2018 | Lai | H04L 65/1069 |
| 2018/0020309 | A1* | 1/2018 | Banerjee | G11B 20/10037 |
| 2018/0191522 | A1* | 7/2018 | Pelletier | H04Q 5/14 |
| 2019/0045441 | A1* | 2/2019 | Knowles | G08B 25/007 |
| 2019/0124445 | A1* | 4/2019 | Banerjee | H04J 3/0641 |
| 2019/0208323 | A1* | 7/2019 | Yazawa | H04S 7/00 |
| 2019/0320515 | A1* | 10/2019 | Sadwick | F21V 23/0471 |
| 2020/0037075 | A1* | 1/2020 | Banerjee | H04R 27/00 |
| 2020/0103513 | A1* | 4/2020 | Knaappila | H04B 17/27 |
| 2021/0029453 | A1* | 1/2021 | Banerjee | H04W 56/0015 |
| 2021/0136551 | A1* | 5/2021 | Chang | H04W 84/20 |
| 2021/0136705 | A1* | 5/2021 | Chang | H04W 56/001 |
| 2021/0152918 | A1* | 5/2021 | Gong | H04M 1/72454 |
| 2021/0153293 | A1* | 5/2021 | Gong | H04W 40/18 |
| 2021/0194295 | A1* | 6/2021 | Kim | H02J 50/80 |
| 2021/0195711 | A1* | 6/2021 | Honda | H05B 47/12 |
| 2021/0400367 | A1* | 12/2021 | Li | H04R 1/10 |
| 2022/0007201 | A1* | 1/2022 | Högberg | H04R 25/505 |
| 2022/0232329 | A1* | 7/2022 | Shriner | H04R 25/02 |
| 2023/0328437 | A1* | 10/2023 | Banerjee | H04R 27/00 |
| | | | | 700/94 |
| 2023/0359427 | A9* | 11/2023 | Wilberding | H04R 1/1041 |
| 2024/0187118 | A1* | 6/2024 | Eriksen | H04W 56/0015 |

FOREIGN PATENT DOCUMENTS

| | | | | |
|---|---|---|---|---|
| EP | | 3823259 B1 * | 2/2023 | G10L 25/48 |
| EP | | 4142204 A1 * | 3/2023 | H04J 3/0632 |
| JP | | 2001-186180 A | 7/2001 | |
| JP | | 2002-252606 A | 9/2002 | |
| JP | | 2003-273853 A | 9/2003 | |
| JP | | 2018-011204 A | 1/2018 | |
| WO | | 2018/012041 A1 | 1/2018 | |

\* cited by examiner

SYNCHRONIZATION DEVICE AND SYNCHRONIZATION METHOD

CROSS REFERENCE TO RELATED APPLICATIONS

This application is a U.S. National Phase of International Patent Application No. PCT/JP2020/045102 filed on Dec. 3, 2020, which claims priority benefit of Japanese Patent Application No. JP 2019-235151 filed in the Japan Patent Office on Dec. 25, 2019. Each of the above-referenced applications is hereby incorporated herein by reference in its entirety.

TECHNICAL FIELD

The present disclosure relates to a synchronization device and a synchronization method.

BACKGROUND ART

A true wireless stereo (TWS) earphone using Bluetooth (registered trademark) is being rapidly popularized. In response to a demand for miniaturization and low power consumption, a Bluetooth Low Energy (BLE) standard, which is a standard with lower power consumption, has been formulated in comparison with conventional Bluetooth standards.

At the time of stereo/audio reproduction by the TWS earphone, it is extremely important to achieve left and right music reproduction synchronization in a state where localization is maintained, and it is required to provide a highly reliable audio reproduction synchronization technology.

In the conventional Bluetooth standards, time information is transmitted from a reproduction device such as a smartphone or a music player during audio reproduction, and reproduction synchronization is achieved by synchronization with the time information. In the BLE standard, however, such time information is not included in a packet, and thus, it is necessary to achieve audio reproduction synchronization using a technique different from the conventional technology.

CITATION LIST

Patent Document

Patent Document 1: Japanese Patent Application Laid-Open No. 2018-11204

SUMMARY OF THE INVENTION

Problems to be Solved by the Invention

The present disclosure provides a synchronization device and a synchronization method capable of accurately achieving synchronization between a master and a slave that perform wireless communication.

Solutions to Problems

In order to solve the problems described above, according to one aspect of the present disclosure, provided is a synchronization device that synchronizes time-series data by wireless communication between a master and a slave, the master including a packet transmission unit that transmits a plurality of packets at a predetermined interval, and the slave including a synchronization unit that synchronizes time-series data transmitted by the master and time-series data received by the slave on the basis of the interval between the plurality of packets.

Another aspect of the present disclosure provides a synchronization device that synchronizes time-series data by wireless communication between a master and a plurality of slaves, the master including a packet transmission unit that transmits a plurality of packets at a predetermined interval, and one of the plurality of slaves including a synchronization unit that synchronizes received time-series data with time-series data transmitted by the master on the basis of the interval between the plurality of packets.

The slave may include: a packet reception unit that receives the plurality of packets; and a counter that counts the interval of each of the received packets, and the synchronization unit may synchronize the time-series data transmitted by the master and the time-series data received by the slave on the basis of a count value of the counter.

The master may include a packet generator that generates the plurality of packets including information regarding the interval of the packet and the time-series data, and the slave may include a frequency adjustment unit that adjusts a frequency of a reference clock signal of the counter on the basis of the information regarding the interval of the packet received by the packet reception unit.

The slave may include: an interval information extraction unit that extracts the information regarding the interval of the packet from the plurality of packets received by the packet reception unit; and a difference detection unit that detects a difference between an ideal count value calculated on the basis of the extracted information regarding the interval of the packet and the count value of the counter, and the frequency adjustment unit may adjust the frequency of the reference clock signal on the basis of the difference.

The frequency adjustment unit may adjust the frequency of the reference clock signal such that the difference becomes a predetermined value or less.

The slave may include: a clock generator that generates a source clock signal; and a frequency divider that divides the source clock signal to generate the reference clock signal, the frequency adjustment unit may adjust the frequency of the reference clock signal by controlling a dividing ratio of the frequency divider on the basis of the difference, and the counter may count the interval of each of the packets in synchronization with the reference clock signal.

The slave may include: an end time information acquisition unit that acquires information regarding transmission end times included in the plurality of packets transmitted from the master; and a start time calculation unit that calculates information regarding a start time of reproduction or processing of the time-series data included in the plurality of packets on the basis of the information regarding the transmission end times, and the synchronization unit may determine a reproduction or processing time of the time-series data included in the plurality of packets on the basis of the calculated information regarding the start time of the reproduction or processing of the time-series data and a count value of the counter after the frequency of the reference clock signal is adjusted by the frequency adjustment unit.

The slave may include: a comparator that compares the count value of the counter with the calculated information regarding the start time of reproduction or processing of the time-series data; and an instruction unit that instructs the reproduction or processing of the time-series data included in the plurality of received packets in a case where the comparator detects that the count value of the counter has reached the start time.

The packet transmission unit may transmit a packet group including the plurality of packets a plurality of times at a predetermined interval, the counter in the slave may measure an interval of each of the packets included in each of the packet groups, and the synchronization unit may synchronize, for each of the packets included in each of the packet groups, time-series data in the packet with corresponding time-series data in the packet generated by the master.

The packet transmission unit may transmit a packet group including the plurality of packets a plurality of times at a predetermined interval, the counter in the slave may measure an interval of each of the packets included in the packet group and measure an interval of the packet group, and the synchronization unit may synchronize, for each of the packets included in each of the packet groups and for each of the packet groups, time-series data in the packet with corresponding time-series data in the packet generated by the master.

The time-series data may be data including biological information or audio data.

A plurality of the slaves performing wireless communication with the master may be provided, and the packet reception unit in one of the plurality of slaves may perform the wireless communication with the master at different timings to receive the plurality of packets including unique time-series data transmitted from the master.

The master may be an information providing terminal including a storage unit that stores audio data, two of the slaves performing wireless communication with the information providing terminal at different timings may be provided, and one of the two slaves may be an earphone that reproduces audio data for a left ear, the audio data being transmitted from the master, and the other may be an earphone that reproduces audio data for a right ear, the audio data being transmitted from the master.

One aspect of the present disclosure provides a synchronization device that synchronizes time-series data by wireless communication between a master and a slave, the master including: a first detection unit that detects an interval between a plurality of packets received from an information providing terminal by the master; and a first packet transmission unit that transmits a packet including information regarding the interval detected by the first detection unit to the slave, and the slave including: a second detection unit that detects an interval between a plurality of packets received from the information providing terminal by the slave; and a synchronization unit that synchronizes time-series data received by the master from the information providing terminal and time-series data received by the slave from the information providing terminal on the basis of the interval detected by the second detection unit and the interval detected by the first detection unit.

The first detection unit may include: a first counter that performs a counting operation in synchronization with a first reference clock signal; and a second counter that counts the interval between the plurality of packets transmitted from the information providing terminal in synchronization with the second reference clock signal, and the second detection unit may include: a third counter that performs a counting operation in synchronization with a third reference clock signal; and a fourth counter that counts the interval between the plurality of packets transmitted from the information providing terminal in synchronization with a fourth reference clock signal.

The synchronization unit may synchronize time-series data in a packet received from the information providing terminal by the slave with corresponding time-series data in a packet received from the information providing terminal by the master on the basis of a count value of the first counter, a count value of the second counter, a count value of the third counter, and a count value of the fourth counter.

The slave may include a second packet transmission unit that transmits a packet including a count value of the third counter and a count value of the fourth counter to the master.

The slave may adjust a frequency and a phase of the fourth reference clock signal on the basis of a count value of the second counter transmitted from the master.

The slave may include: a difference calculation unit that calculates a difference between the count value of the second counter transmitted from the master and a count value of the fourth counter; and a frequency adjustment unit that adjusts a frequency of the fourth reference clock signal on the basis of the difference.

The slave may include a start time calculation unit that calculates information regarding a start time of reproduction or processing of time-series data on the basis of information regarding a transmission end time included in a plurality of packets transmitted from the information providing terminal, and the synchronization unit may synchronize a time at which the reproduction or processing of the time-series data is to be performed with the master on the basis of a count value of the third counter, a count value of the fourth counter after the frequency of the fourth reference clock signal is adjusted by the frequency adjustment unit, the difference calculated by the difference calculation unit after the frequency of the fourth reference clock signal is adjusted by the frequency adjustment unit, and the information regarding the start time.

The frequency adjustment unit may adjust the frequency of the fourth reference clock signal on the basis of the difference when the master and the slave start packet communication, and the synchronization unit may synchronize the time at which the reproduction or processing of the time-series data is to be performed with the master while the master and the slave perform the packet communication with the information providing terminal.

The slave may include: a fifth counter that counts a delimiter of reproduced or processed time-series data; and a count value acquisition unit that acquires a count value of the third counter and a count value of the fourth counter each time the fifth counter counts up, and the second packet transmission unit may transmit the count value of the third counter and the count value of the fourth counter acquired by the count value acquisition unit to the master.

The time-series data may be audio data, and the fifth counter may count the number of frames of the audio data.

One of the master and the slave may be a first earphone that receives audio data for a left ear from the information providing terminal, and the other may be a second earphone that receives audio data for a right ear from the information providing terminal at a different timing different from the first earphone.

The master and the slave may perform packet communication conforming to a Bluetooth (registered trademark) low energy standard.

Another aspect of the present disclosure provides a synchronization method for synchronizing time-series data by wireless communication between a master and a slave, the synchronization method including: transmitting, by the master, a plurality of packets at a predetermined interval; and synchronizing, by the slave, time-series data transmitted by the master and time-series data received by the slave on the basis of the interval between the plurality of packets.

MODE FOR CARRYING OUT THE INVENTION

Hereinafter, an embodiment of the present disclosure will be described in detail.

Schematic Description of Synchronization Device

A synchronization device according to the present embodiment synchronizes time-series data by wireless communication between a master and a slave. The master transmits a packet including time-series data to the slave by wireless communication, and the slave performs a process of synchronizing the time-series data included in the received packet with time-series data of the master.

Types of the time-series data transmitted and received by the master and the slave are not limited. As an example, the time-series data may be data including biological information or audio data. Hereinafter, an example in which the master and the slave synchronize the audio data will be mainly described. In this case, the master may be an information providing terminal that provides the audio data, and the slave may be an earphone. Alternatively, the master may be one of left and right earphones and the slave may be the other earphone.

Figure 1:
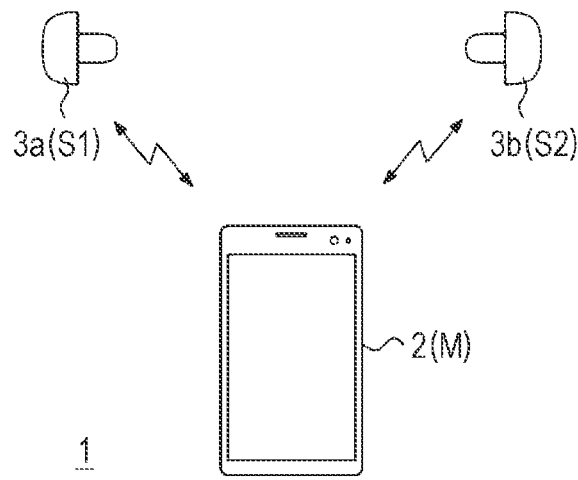
FIG. 1 is a view illustrating a schematic configuration of a synchronization device according to an embodiment.

FIG. 1 is a view illustrating a schematic configuration of a synchronization device 1 according to the present embodiment. The synchronization device 1 of FIG. 1 includes: an information providing terminal 2, for example, a smartphone, a tablet, a mobile phone, a portable music player, and the like; and right and left earphones 3a and 3b that receive audio data from the information providing terminal 2 and perform sound output. The information providing terminal 2 may be a master M, and the right and left earphones 3a and 3b may be slaves S1 and S2. Alternatively, one of the left and right earphones 3a may be the master M and the other may be a slave S.

In the present embodiment, it is assumed that the master M and the slaves S1 and S2 perform wireless communication using the above-described Bluetooth (registered trademark) Low Energy (BLE). The BLE requires lower power consumption than normal Bluetooth, and can extend a continuous use time in small communication devices such as the earphones 3a and 3b each having a limited battery capacity, and thus, is expected to be widely used in the future.

For example, in the case where the master M is the information providing terminal 2 and the slaves S1 and S2 are the right and left earphones 3a and 3b, according to the BLE standard, only audio data for the earphones 3a and 3b is transmitted from the master M to each of the earphones 3a and 3b. That is, audio data for one of the earphones 3a and 3b is not transmitted to the other of the earphones 3a and 3b. Since the earphones 3a and 3b communicate wirelessly, it is necessary to perform a process of synchronizing pieces of the audio data received by the earphones 3a and 3b between the information providing terminal 2 and each of the earphones 3a and 3b and to synchronize the earphones 3a and 3b. The present embodiment has a technical feature in synchronization processing performed between the master M and each of the slaves S1 and S2. First, the BLE standard will be described.

Moreover, it is described that the accuracy of a clock for a BLE-PHY counter used within a BLE device has a deviation of ±2 μs or less.

Furthermore, regarding a connection requirement and a clock requirement, isochronous connection (ISO) and an asynchronous connection interval (ACL) are defined in the BLE standard.

In the present embodiment, the master M and the slaves S1 and S2 perform transmission of audio data and clock recovery by the isochronous connection (ISO), and counter values are exchanged between the right and left earphones 3a and 3b through a genetic attribute (GATT) profile by the asynchronous connection-less (ACL) to adjust a deviation of a counter.

Figure 2:
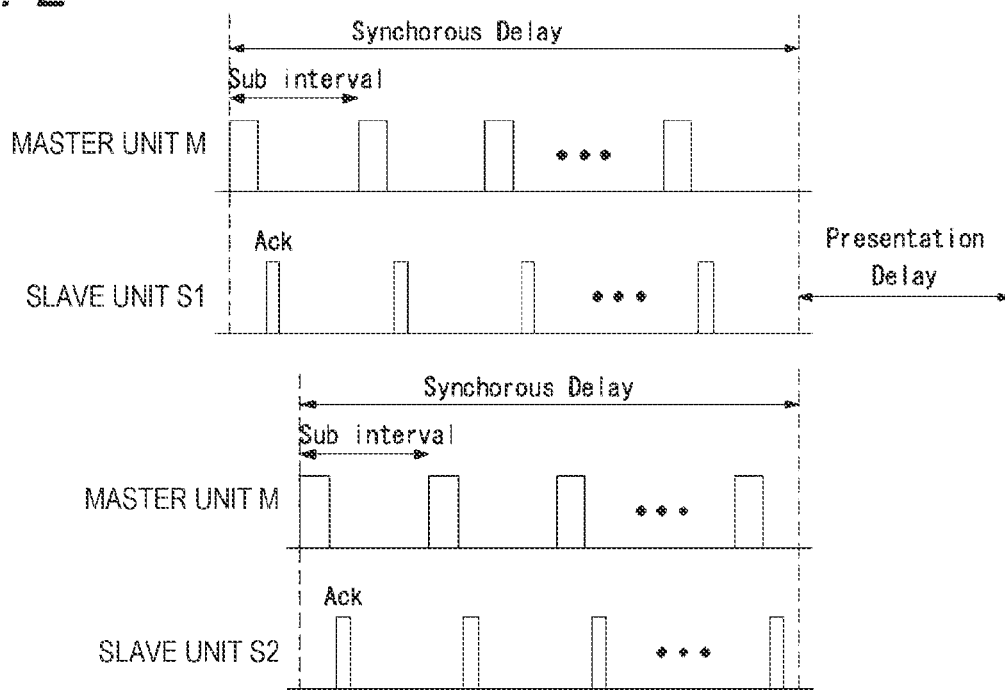
FIG. 2 is a view illustrating a packet communication timing conforming to a BLE standard.

FIG. 2 is a view illustrating a packet communication timing conforming to the BLE standard. FIG. 2 illustrates an example in which a packet including audio data for reproduction is transmitted from the master M (information providing terminal 2) to the two slaves S1 and S2 (right and left earphones 3a and 3b). In an ISO interval, each of a plurality of packets is arranged at a predetermined interval. A transmission interval of one packet is referred to as a sub interval. The slaves S1 and S2 that have received the packet from the master M transmit the packet including acknowledgement (ACK) information to the master M. A transmission period of a packet group including a plurality of packets is called a synchronization delay, and information of a synchronization delay is included in the packet to be transmitted from the master M to the slaves S1 and S2.

As can be seen from FIG. 2, packet transmission times are different between the right and left earphones 3a and 3b. As described above, in the BLE, a packet including left audio data is transmitted to the left earphone 3b, and a packet including right audio data is transmitted to the right earphone 3a. Furthermore, it is difficult to simultaneously transmit the packets to right and left earphones 3a and 3b in the BLE. For this reason, the packet transmission times are different between left earphone 3b and right earphone 3a as illustrated in FIG. 2. However, end times of the synchronization delays are matched between the right and left earphones 3a and 3b by defining the synchronization delays in the left packet and the right packet, respectively.

In the present embodiment, the reproduction of audio data is started by the right and left earphones 3a and 3b after a period of a presentation delay elapses from the end times of the synchronization delays.

Figure 3:
FIG. 3 is a view illustrating a data configuration of one packet transmitted within a sub interval of FIG. 2.

FIG. 3 is a view illustrating a data configuration of one packet transmitted within the sub interval of FIG. 2. The packet in FIG. 3 has the data configuration conforming to the BLE standard, and is called a BLE packet. As illustrated in FIG. 3, the BLE packet includes a preamble, an access address, a PDU, and a CRC. The preamble does not include data related to audio data, but includes a BLE modulated signal. The access address includes information for identifying a communication partner and information indicating a type of the packet. The PDU includes not only audio data but also information (BLE parameters) regarding the above-described synchronization delay and packet interval. The CRC is data for error check.

Figure 4:
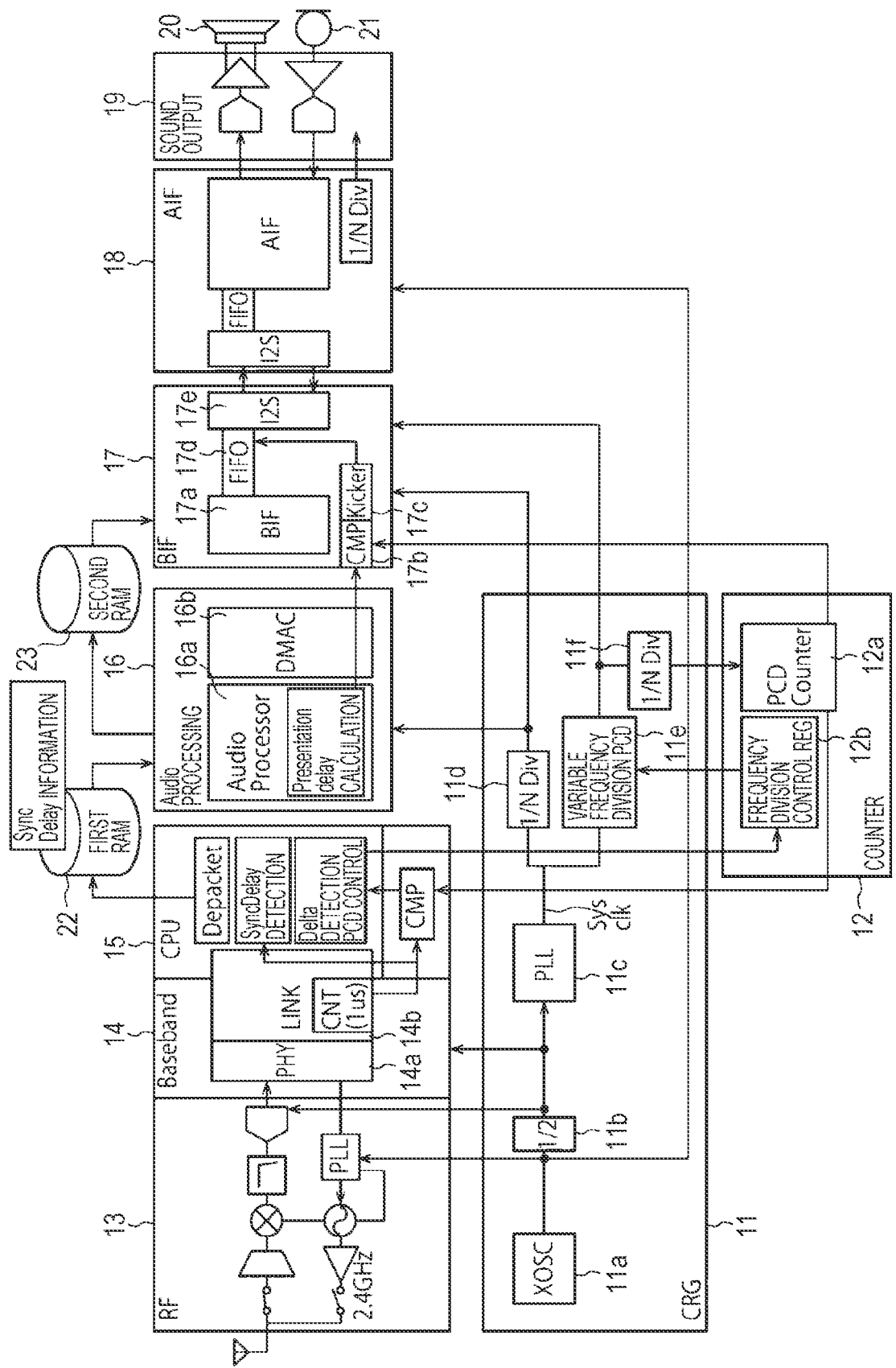
FIG. 4 is a block diagram illustrating an example of a hardware configuration of a master or a slave constituting a part of a synchronization device 1 according to the present embodiment.

FIG. 4 is a block diagram illustrating an example of a hardware configuration of the master M or the slaves S1 and S2 constituting a part of the synchronization device 1 according to the present embodiment. More specifically, FIG. 4 illustrates a hardware configuration of the earphone 3a or 3b. As described above, the earphone 3a or 3b in FIG. 4 operate as the slaves S1 and S2 at the time of receiving the audio data from the information providing terminal 2. Furthermore, the earphones 3a and 3b operate as the master M or the slave S at the time of performing synchronization processing therebetween.

The earphone 3a or 3b in FIG. 4 includes a clock generation unit (CRG) 11, a counter unit 12, a radio frequency (RF) unit 13, a baseband unit 14, a CPU 15, an audio processor 16, a buffer interface (BIF) 17, an audio interface (AIF) 18, an audio chip 19, a speaker 20, and a microphone 21.

The RF unit 13 performs a process of receiving and demodulating a wireless signal including the packet illustrated in FIG. 2. Although an internal configuration of the RF unit 13 is not described, the RF unit 13 receives the wireless signal in a 2.4 GHz band and performs demodulation processing conforming to the BLE standard. In this manner, the RF unit 13 functions as a packet reception unit that receives a plurality of packets transmitted from the master M.

The baseband unit 14 includes a PHY unit 14a and a LINK unit 14b. The PHY unit 14a converts the signal demodulated by the RF unit 13 into a digital signal. The LINK unit 14b extracts a packet having a specific access address, and calculates a PCD count value that is ideal (ideal PCD count value) from information of a packet interval included in the packet. The PCD count value is a count value of a counter (referred to as a PCD counter 12a) that counts an interval between packets transmitted from the master M as described later. In this manner, the LINK unit 14b functions as an information extraction unit that extracts information regarding the packet interval included in the received packet, and an ideal count value calculation unit that calculates an ideal count value on the basis of the extracted information regarding the packet interval. Furthermore, the LINK unit 14b may receive a PCD count value of the communication partner as the ideal PCD count value.

The CPU 15 performs comparison processing (CMP), PCD control processing, Sync delay detection processing (an end time information acquisition unit), and Depacket processing. In the comparison processing, the ideal PCD count value calculated by the LINK unit 14b or the PCD count value of the communication partner is compared with a count value of the PCD counter 12a in the own device as described later.

In the PCD control processing, a difference between the ideal PCD count value and the count value of the PCD counter 12a is detected on the basis of a comparison result obtained in the comparison processing, and a frequency of a reference clock signal for operating the PCD counter 12a is controlled on the basis of the difference.

In the Depacket processing, a content of the received packet is extracted. In the Sync delay detection processing, a synchronization delay included in the received packet is detected. The information such as the synchronization delay and the audio data in the packet is stored in a first RAM 22. The data stored in the first RAM 22 is read by the audio processor 16.

In this manner, the CPU 15 functions as an interval information extraction unit that extracts information regarding the packet intervals from the plurality of received packets, a difference detection unit that detects a difference between an ideal count value calculated on the basis of the extracted information regarding the packet intervals and the count value of the PCD counter 12a, and a frequency adjustment unit that adjusts the frequency of the reference clock signal on the basis of the difference.

Furthermore, in a case where adjustment of a sound output timing and confirmation of a sound deviation are performed between the right and left earphones 3a and 3b, the CPU 15 performs a process of generating an LR synchronization packet synchronized between the right and left earphones 3a and 3b and a process of generating a reproduction delay value at the time of LR communication.

The audio processor 16 includes a DSP 16a, reads information of a packet stored in the first RAM 22, and calculates the above-described presentation delay. Furthermore, the audio processor 16 incorporates a DMAC 16b that performs DMA transfer of audio data of a packet stored in the first RAM 22. The DMAC 16b stores the audio data in a second RAM 23.

Furthermore, in the case where the adjustment of the sound output timing and the confirmation of the sound deviation are performed between the right and left earphones 3a and 3b, the audio processor 16 performs packet delay processing using the reproduction delay value generated by the CPU 15 and an audio data mix processing in consideration of the reproduction delay value.

The clock generation unit 11 includes a crystal oscillator 11a, a ½ frequency divider 11b, a PLL circuit (SysPLL) 11c, a 1/N frequency divider 11d, a variable frequency division PCD clock generation unit 11e, and a ¼ frequency divider 11f. The crystal oscillator 11a outputs a source oscillation signal of 32 MHz, for example. The ½ frequency divider 11b outputs a frequency-divided signal obtained by lowering a frequency of the source oscillation signal to ½. The PLL circuit 11c generates a clock signal to be PLL-controlled using the frequency-divided signal. A frequency of the clock signal is, for example, a signal having a frequency higher than the frequency of the source oscillation signal. The 1/N frequency divider 11d generates a frequency-divided signal obtained by lowering the frequency of the clock signal to 1/N. The variable frequency division PCD clock generation unit 11e variably controls a frequency of a clock signal, which serves as the basis of the reference clock signal for operating the PCD counter 12a, according to the difference between the ideal PCD count value and the count value of the PCD counter 12a. The frequency of the clock signal output from the variable frequency division PCD clock generation unit 11e is divided by four by the ¼ frequency divider 11f, thereby generating the reference clock signal.

The counter unit 12 includes the PCD counter 12a and a frequency division control register 12b. The frequency division control register 12b stores a frequency division control value corresponding to the difference between the ideal PCD count value and the count value of the PCD counter 12a calculated by the CPU 15 described above. The above-described variable frequency division PCD clock generation unit 11e sets a dividing ratio of a clock signal on the basis of the frequency division control value stored in the frequency division control register 12b.

The PCD counter 12a is a 32-bit counter that performs a counting operation in synchronization with the reference clock signal output from the ¼ frequency divider 11f. The PCD counter 12a counts an interval of a packet transmitted from the master M in synchronization with the reference clock signal. The count value of the PCD counter 12a is transmitted to the CPU 15 and also transmitted to the BIF 17.

The BIF 17 includes a BIF unit 17a, a comparator (CMP) 17b, a trigger generator (a kicker or an instruction unit) 17c, a FIFO 17d, and an I2S communication unit 17e. The comparator 17b compares a value corresponding to a reproduction time, which is determined by the synchronization delay included in the packet transmitted from the master M and the presentation delay calculated by the audio processor 16, with the count value of the PCD counter 12a. In a case where the comparator 17b detects matching, the trigger generator 17c outputs a trigger signal.

In a case where the trigger signal is output from the trigger generator 17c, the FIFO 17d sequentially outputs pieces of audio data stored in the second RAM 23. The pieces of audio data output from the FIFO 17d are serially transmitted to the AIF 18 via the I2S communication unit 17e.

In this manner, the BIF 17 functions as a synchronization unit that determines a reproduction or processing time of time-series data included in the plurality of packets on the basis of the calculated information regarding a start time of reproduction or processing of the time-series data and a count value of the counter after the frequency of the reference clock signal is adjusted by the frequency adjustment unit. More specifically, the synchronization unit synchronizes time-series data in a packet with corresponding time-series data in a packet generated by the master for each packet included in each packet group and for each packet group. That is, the synchronization unit synchronizes the time-series data transmitted by the master and the time-series data received by the slave on the basis of the interval between the plurality of packets transmitted from the master. The synchronization unit synchronizes the time-series data transmitted by the master and the time-series data received by the slave on the basis of the count value of the counter.

The AIF 18 performs predetermined audio processing on audio data output from the BIF 17, and then transmits the audio data to the audio chip 19. The audio chip 19 performs D/A conversion on the audio data from the AIF 8 and outputs the audio data to the speaker 20. Furthermore, a surrounding audio signal collected by the microphone 21 is subjected to A/D conversion and sent to the AIF 18.

Figure 5:
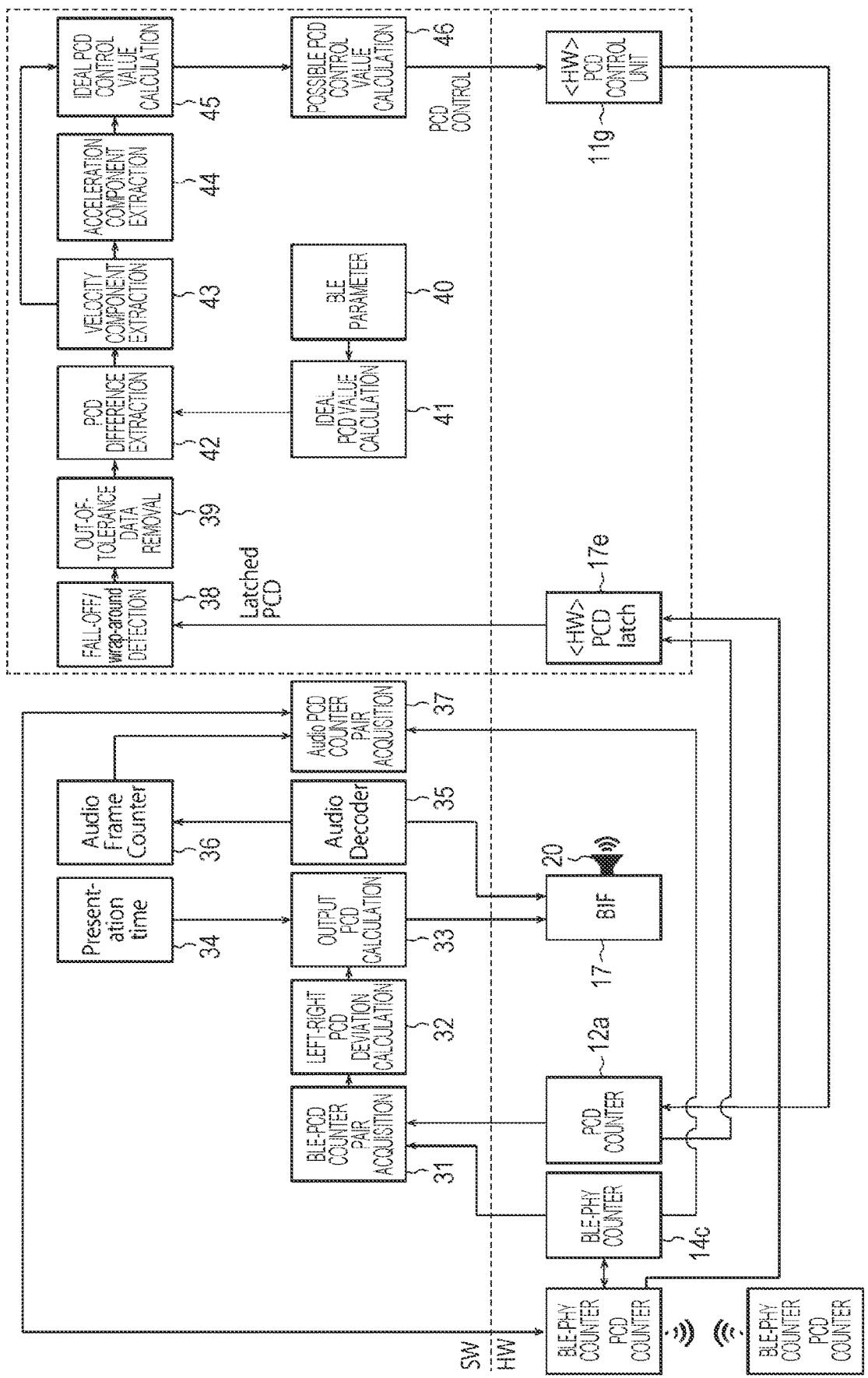
FIG. 5 is a functional block diagram of software processing performed by the master and the slave.

FIG. 5 is a functional block diagram of software processing performed by the master M and the slaves S1 and S2. More specifically, an upper side of a broken line in FIG. 5 represents functional blocks of the software processing, and a lower side of the broken line represents hardware configuration blocks related to the software processing.

The hardware configuration blocks illustrated in FIG. 5 are associated with some blocks in the block diagram of FIG. 4. For example, a BLE-PHY counter 14c in FIG. 5 is provided inside the LINK unit 14b in FIG. 4. The PCD counter 12a in FIG. 5 corresponds to the PCD counter 12a inside the counter unit 12 in FIG. 4. The BIF 17 in FIG. 5 corresponds to the BIF 17 in FIG. 4. Note that, in practice, the AIF 18 and the audio chip 19 are present between the BIF 17 and the speaker 20 as illustrated in FIG. 4 although not illustrated in FIG. 5. A PCD latch unit 17f of FIG. 5 is provided in, for example, the comparator 17a of FIG. 4. A PCD control unit 11g of FIG. 5 is provided in the variable frequency division PCD clock generation unit 11e of FIG. 4.

The software functional block diagram illustrated in FIG. 5 includes a BLE-PCD counter pair acquisition unit 31, a left-right PCD deviation calculation unit 32, an output PCD calculation unit 33, a presentation delay calculation unit (start time calculation unit) 34, an audio decoder 35, an audio frame counter (fifth counter) 36, an audio PCD counter pair acquisition unit (count value acquisition unit) 37, a fall-off/wrap-around detection unit 38, an out-of-tolerance data removal unit 39, a BLE parameter extraction unit 40, an ideal PCD value calculation unit 41, a PCD difference extraction unit 42, a velocity component extraction unit 43, an acceleration component extraction unit 44, an ideal PCD control value calculation unit 45, and a possible PCD control value calculation unit 46. These software functional blocks are mainly executed by the CPU 15 in FIG. 4.

The BLE-PCD counter pair acquisition unit 31 acquires a pair of a count value of the BLE-PHY counter 14c and a count value of the PCD counter 12a of a communication partner (for example, the master M), and acquires a pair of a count value of the BLE-PHY counter 14c and a count value of the PCD counter 12a of the own device (for example, the slave S1 or S2). Calibration processing is periodically performed such that the count values of the BLE-PHY counters 14c become the same value between the master M and the slaves S1 and S2 or a difference between the count values becomes the same. For this reason, in the following description, it is assumed that the count values of the master-side and slave-side BLE-PHY counters 14c are the same or has the same difference.

The left-right PCD deviation calculation unit 32 calculates a difference between a count value of the PCD counter 12$a$ of the master M and a count value of the PCD counter 12$a$ of the slave S1 or S2. The presentation delay calculation unit 34 calculates a presentation delay from a synchronous delay included in a packet transmitted from the communication partner (for example, the master M). The output PCD calculation unit 33 calculates a count value of the PCD counter 12$a$ corresponding to a reproduction time of audio data on the basis of the difference between the count values of the PCD counter 12$a$ calculated by the left-right PCD deviation calculation unit 32 and the presentation delay.

The audio frame counter 36 counts the number of output audio frames. The audio PCD counter pair acquisition unit 37 acquires a count value of the PCD counter 12$a$ and a count value of the BLE-PHY counter 14$c$ of the own device (for example, the slave S1 or S2) at the count-up timing of the audio frame counter 36. The count values of the PCD counter 12$a$ and the BLE-PHY counter 14$c$ acquired by the audio PCD counter pair acquisition unit 37 are transmitted to the communication partner (for example, the master M).

The fall-off/wrap-around detection unit 38 interpolates a count value in a case where PCD counter 12$a$ fails to count a packet interval. Furthermore, since the PCD counter 12$a$ re-counts from zero if reaching the maximum count value, the re-counting from zero in the middle of counting of the PCD counter 12$a$ is detected to calculate a count value corresponding to the packet interval.

In a case where a count value of the PCD counter 12$a$ is not within an assumed range, the out-of-tolerance data removal unit 39 removes the count value to improve reliability of the count value.

The BLE parameter extraction unit 40 extracts a BLE parameter included in a received packet. The BLE parameter includes, for example, information regarding a parameter interval. The ideal PCD value calculation unit 41 calculates an ideal PCD count value on the basis of the information regarding the packet interval included in the BLE parameter. More specifically, the ideal PCD value calculation unit 41 latches the packet interval (connection interval) included in the received packet for each access address by the PHY unit 14$a$, and sets a PCD count value of the master M at that time as an expected value.

The PCD difference extraction unit 42 compares the value obtained by latching the count value of the PCD counter 12$a$ in the own device (for example, the slave S1 or S2) by the PCD latch unit 17$f$ with the ideal PCD count value, and extracts a difference therebetween. Since there is a possibility that an abnormal value is included in the difference extracted by the PCD difference extraction unit 42, an abnormal difference value is excluded by checking a change rate or the like of the differences for a plurality of times instead of detecting the difference for each time.

For example, when a PCD count value of an Nth connection interval is PCDresultN and an Nth ideal PCD count value is PCDreferN, a difference ΔPCDdiff is calculated by the following Formula (1).

$$\Delta PCDdiff = \{(PCDresultN - PCDresult1) - (PCDreferN - PCDrefer1)\}/N \quad (1)$$

Figure 6:
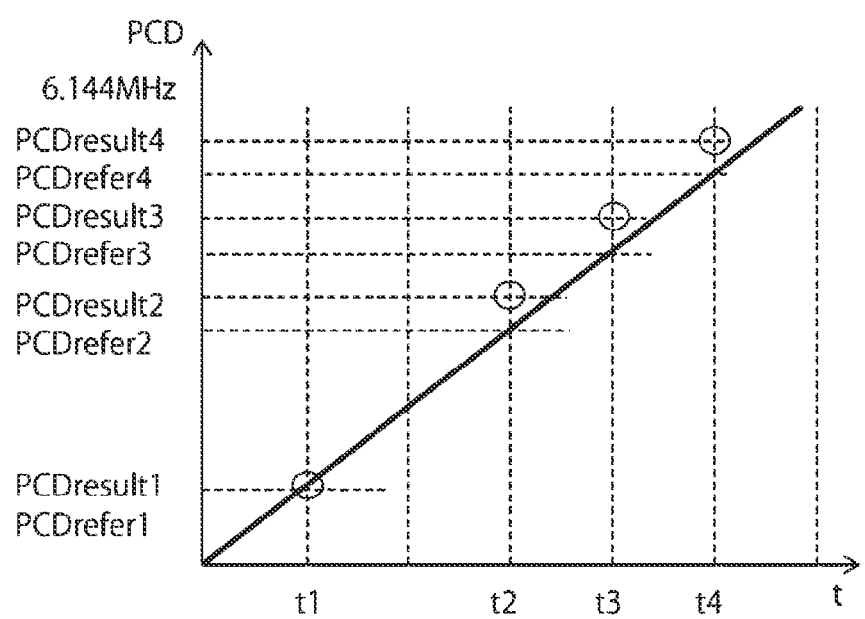
FIG. 6 is a view illustrating an example of a relationship between a PCD count value and an ideal PCD count value.

FIG. 6 is a view illustrating an example of a relationship between a PCD count value and an ideal PCD count value. In FIG. 6, the horizontal axis represents time, and the vertical axis represents the PCD count value. White circles in FIG. 6 indicate PCD count values, and a straight line in FIG. 6 indicates the ideal PCD count value. The PCD count value at time t2 is excluded by the out-of-tolerance data exclusion unit. A distance between the straight line and the white circle represents a difference between the PCD count values. The PCD count value includes some errors each time a packet is received, but a highly reliable difference can be calculated by taking measurement results of PCD count values for a plurality of times into consideration.

The velocity component extraction unit 43 extracts a velocity component indicating a value of the difference extracted by the PCD difference extraction unit 42 changing per unit time. The acceleration component extraction unit 44 extracts an acceleration component indicating a value of the velocity component extracted by the velocity component extraction unit 43 changing per unit time.

The ideal PCD control value calculation unit 45 calculates a PCD control value such that the velocity component and the acceleration component approach zero. A state transition may be provided to calculate a PCD control value that is slightly over or under, control may be abandoned in some cases, or a gain of a PCD control value may be adjusted such that the control value is increased in the initial state and a change rate of the control value is decreased in a state other than the initial state.

The possible PCD control value calculation unit 46 performs a rounding process such that a PCD control value falls within a predetermined range. The PCD control value calculated by the possible PCD control value calculation unit 46 is stored in the frequency division control register 12$b$ of FIG. 4. The variable frequency division PCD clock generation unit 11$e$ generates a clock divided at a dividing ratio corresponding to a PCD control value. The ¼ frequency divider 11$f$ generates the reference clock signal on the basis of this clock.

Figure 7:
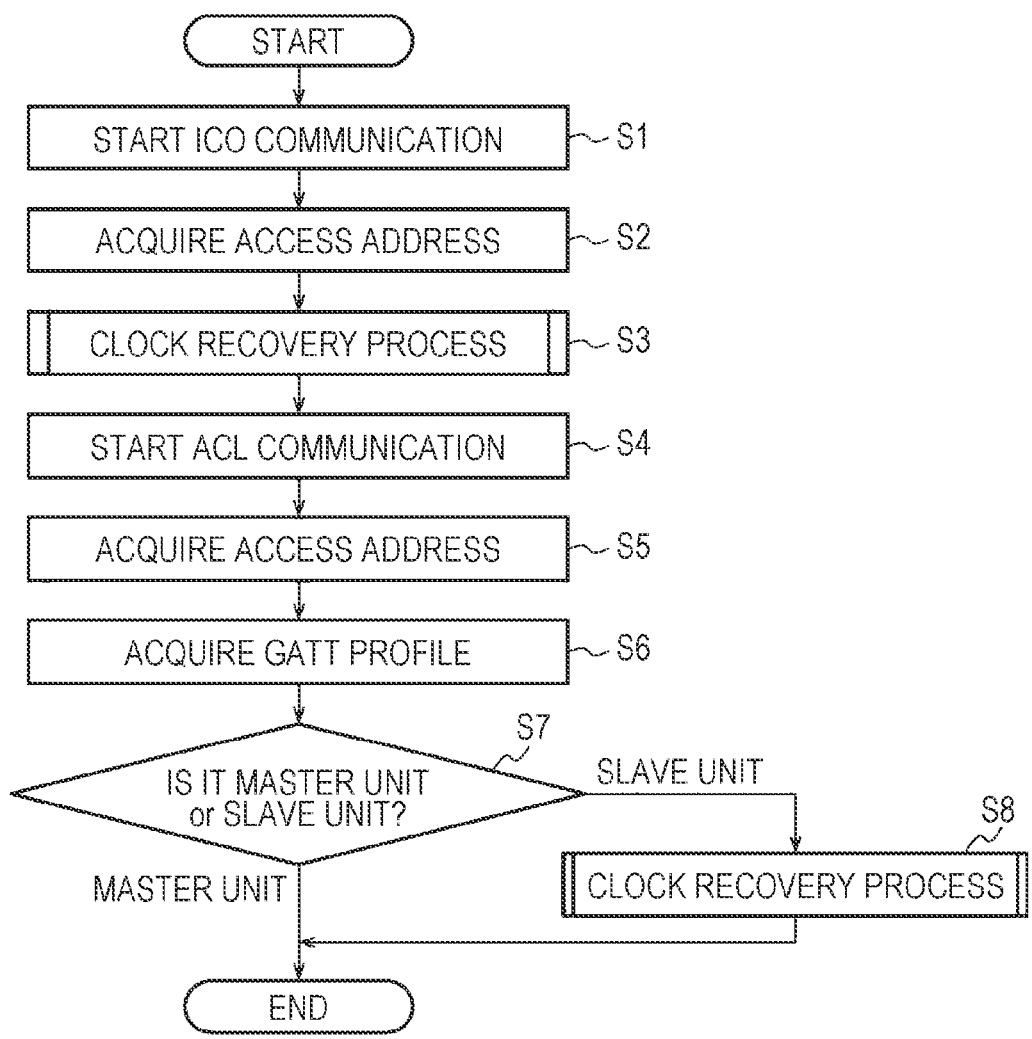
FIG. 7 is a flowchart illustrating a processing operation in a case where the master is an information providing terminal such as a smartphone and the slave is an earphone.

FIG. 7 is a flowchart illustrating a processing operation in a case where the master M is the information providing terminal 2 such as a smartphone and the slaves S1 and S2 are the earphones 3$a$ and 3$b$. First, isychronous connection-oriented (ICO) communication is performed between the master M and the slaves S1 and S2 (step S1). In the ICO communication, each of a plurality of packets is sequentially transmitted at a predetermined interval as illustrated in FIG. 3.

Next, each of the master M and the slaves S1 and S2 acquires an access address included in a packet transmitted from a communication partner (step S2). The communication partner can be identified by the access address. In this case, it is determined whether or not the packet is a packet from the communication partner on which a clock recovery process is to be performed as described later.

In a case where the communication partner has been identified by the access address, the clock recovery process is started (step S3). In the clock recovery process, as will be described in detail later, a process of counting an interval between packets transmitted from the information providing terminal 2 functioning as the master M by the PCD counters 12$a$ of the slaves S1 and S2 and controlling the frequency of the reference clock signal for operating the PCD counters 12$a$ such that the count values of the PCD counters 12$a$ match the ideal PCD count value is performed.

Next, asynchronous connection-less (ACL) communication is started between the left slave S1 or S2 (earphone 3$a$ or 3$b$) and the right slave S1 or S2 (earphone 3$a$ or 3$b$) (step S4). In the ACL communication, a packet is transmitted and received between the right and left earphones 3$a$ and 3$b$ to perform timing adjustment of reproduction times and confirmation of a sound deviation.

First, an access address is acquired (step S5). The communication partner is identified by the access address. Next, a profile of a genetic attribute (GATT) included in the received packet is acquired (step S6). Next, whether the master M or the slave S1 or S2 is determined on the basis of the acquired GATT (step S7). In a case of the master M, the flowchart of FIG. 7 ends. On the other hand, in a case of the slave S1 or S2, the clock recovery process is performed (step S8). In the clock recovery process in step S8, the earphones 3a and 3b as the slaves S1 and S2 acquire PCD count values transmitted from the earphones 3a and 3b as the master M, and calculate differences from the PCD count values of slaves S1 and S2, and the frequency of the reference clock signal for operating the PCD counters 12a of the slaves S1 and S2 is adjusted so as to decrease the difference. In this manner, the clock recovery process performed after pairing is performed only by the slaves S1 and S2.

Figure 8:
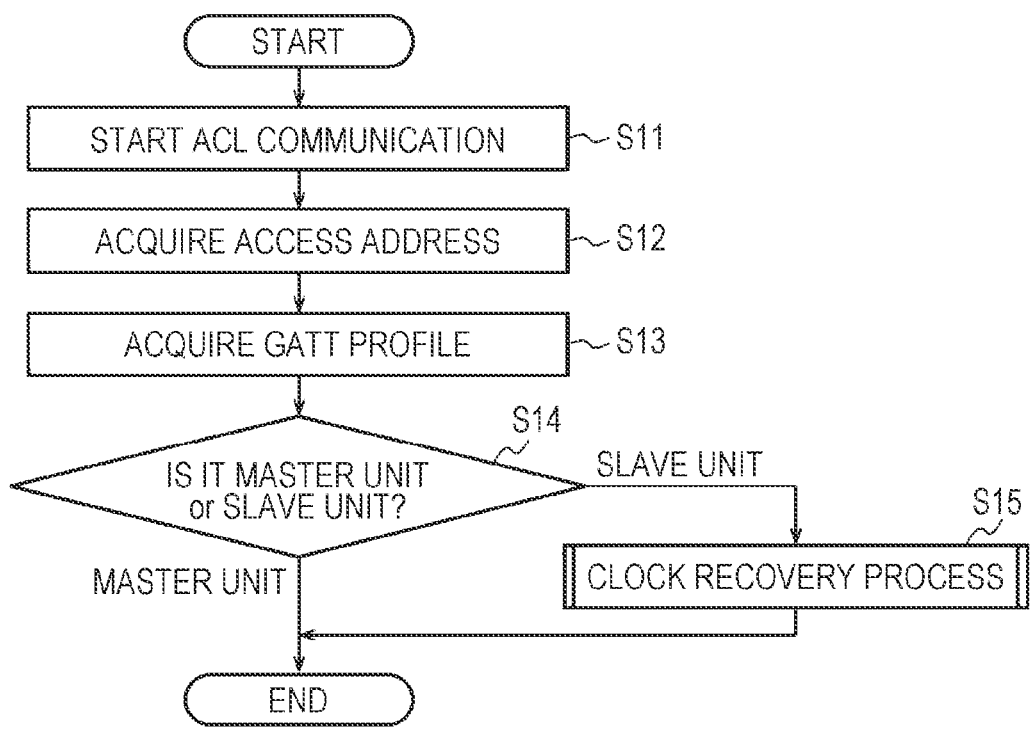
FIG. 8 is a flowchart illustrating a processing operation in a case where one of the master and the slave is a left earphone and the other is a right earphone.

FIG. 8 is a flowchart illustrating a processing operation in a case where one of the master M and the slave S is the left earphone 3b and the other is the right earphone 3a. First, the ACL communication is started (step S11). Next, an access address is acquired (step S12). Next, a GATT profile is acquired (step S13). Next, whether the master M or the slave S is determined on the basis of the acquired GATT profile (step S14). The processing in FIG. 9 is ended when it is determined to be the master M, and the clock recovery process illustrated in FIG. 8 is performed when it is determined to be the slave S (step S15).

The processing of FIG. 8 is performed between the right and left earphones 3a and 3b, and is performed for the purpose of achieving synchronization between the right and left earphones 3a and 3b, for example, in a case where pairing processing is performed between the right and left earphones 3a and 3b before pairing with the information providing terminal 2 is performed or while receiving audio data provided from the information providing terminal 2. In this case, the earphone serving as the master performs processing of a first detection unit that detects an interval between a plurality of packets received by the master from the information providing terminal 2 and processing of a first packet transmission unit that transmits a packet including information regarding the interval detected by the first detection unit to the slave. The first detection unit includes the BLE-PHY counter (first counter) 14c and the PCD counter (second counter) 12a in the master. On the other hand, the earphone serving as the slave performs processing of a second detection unit that detects an interval between a plurality of packets received by the slave from the information providing terminal 2 and processing of a synchronization unit that synchronizes time-series data received by the master from the information providing terminal 2 and time-series data received by the slave from the information providing terminal 2 on the basis of the interval detected by the second detection unit and the interval detected by the first detection unit. The second detection unit includes the BLE-PHY counter (third counter) 14c and the PCD counter (fourth counter) 12a in the slave.

Figure 9:
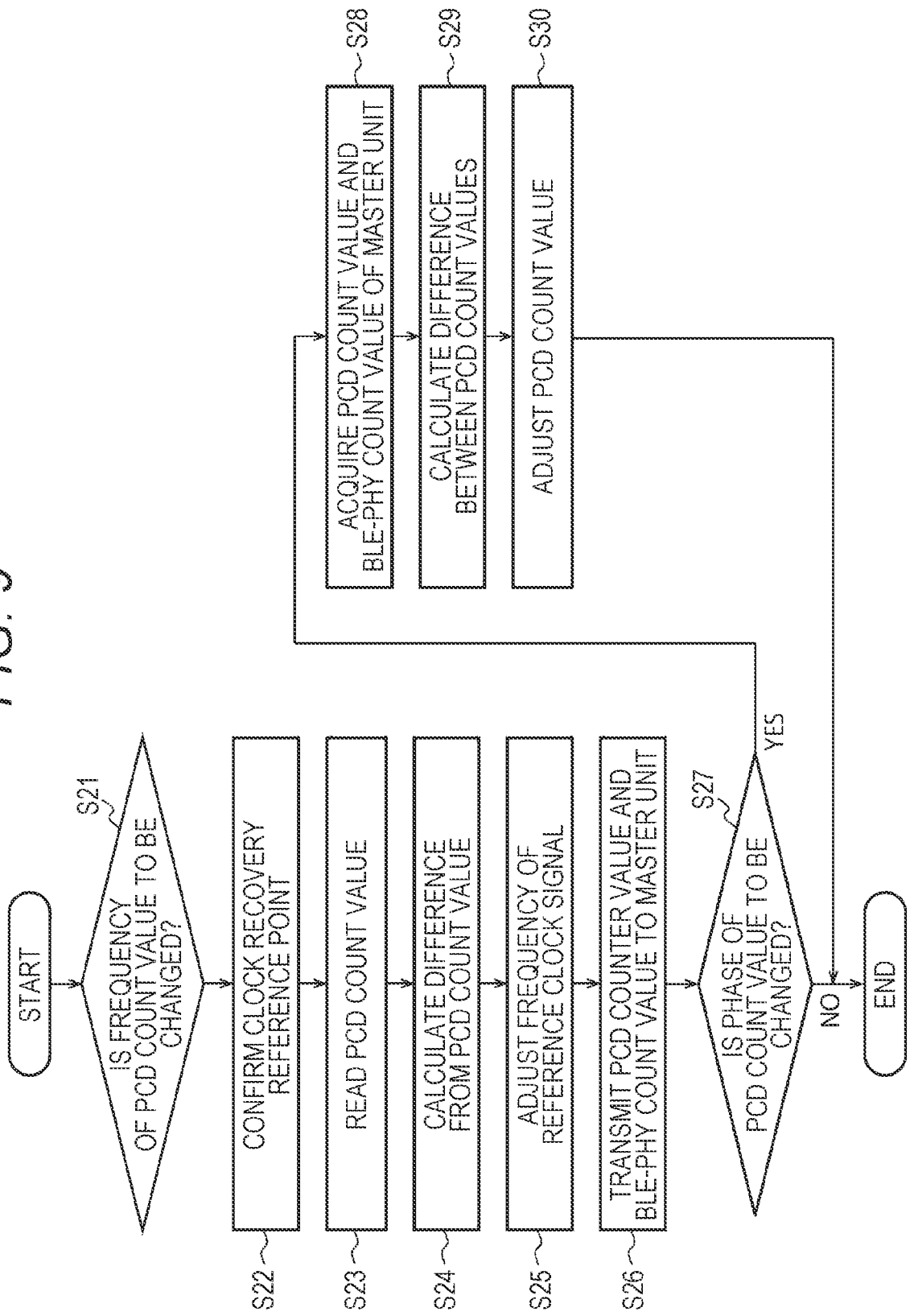
FIG. 9 is a detailed flowchart of a clock recovery process in the flowcharts of FIGS. 7 and 8.

FIG. 9 is a detailed flowchart of the clock recovery process in the flowcharts of FIGS. 7 and 8. The flowchart of FIG. 9 illustrates the clock recovery process performed by the slaves S1 and S2 (earphones 3a and 3b). First, it is determined whether or not to change the frequency of the reference clock signal for operating the PCD counter 12a (step S21). In step S21, in a case where the master M is the information providing terminal 2 and the slaves S1 and S2 are the earphones 3a and 3b, it is determined that the frequency of the reference clock signal is to be changed.

In a case where it is determined that the frequency of the reference clock signal is to be changed, a reference point (reference time) of clock recovery is set (step S22). Here, for example, a time when a specific packet has been received is set as the reference point. Next, the count value (PCD count value) of the PCD counter 12a in the slave S1 or S2 is read (step S23). Next, a difference between the count value of the PCD counter 12a and the ideal PCD count value calculated on the basis of the packet interval is calculated (step S24). Note that, in step S24, in a case where the right and left earphones 3a and 3b receiving the audio data from the information providing terminal 2 perform the synchronization processing, a difference between a PCD count value transmitted from the master M and a PCD count value of the slave S is calculated by setting one of the earphones 3a and 3b as the master M.

Next, the frequency of the reference clock signal for operating the PCD counter 12a is adjusted on the basis of the calculated difference (step S25). Next, the count value of the PCD counter 12a and the count value of the BLE-PHY counter 14c are paired and transmitted to the master M (step S26).

Next, it is determined whether or not phase adjustment of the count value of the PCD counter 12a is to be performed (step S27). In a case where the master M is the information providing terminal 2, the phase adjustment is not performed, and thus, the processing of FIG. 8 is ended. On the other hand, in a case where the sound output timing is adjusted by the left earphone 3b and the right earphone 3a, it is determined that the phase adjustment is to be performed.

In a case where it is determined that the phase adjustment of the count value of the PCD counter 12a is to be performed, a pair of the count value of the PCD counter 12a and the count value of the BLE-PHY counter 14c transmitted from the master M (one of the earphones 3a and 3b) is acquired (step S28).

Next, a difference between the PCD count value of the master M (one of the earphones 3a and 3b) and the PCD count value of the slave S1 or S2 (the other of the earphones 3a and 3b) is calculated (step S29). Next, the PCD count values of the slaves S1 and S2 are adjusted on the basis of the calculated difference (step S30).

Clock Recovery Process

Next, the clock recovery process will be described in detail. As illustrated in the flowcharts of FIGS. 7 to 9, the clock recovery process is performed not only in the case where the master M is the information providing terminal 2 and the slaves S1 and S2 are the earphones 3a and 3b but also in the case where the master M is one of the earphones 3a and 3b and the slave S is the other of the earphones 3a and 3b.

Processing blocks related to the clock recovery process are in a broken-line frame in the block diagram of FIG. 5. In the clock recovery process, the PCD latch unit 17f and the PCD control unit 11g are used as hardware, and the fall-off/wrap-around detection unit 38, the out-of-tolerance data removal unit 39, the BLE parameter extraction unit 40, the ideal PCD value calculation unit 41, the PCD difference extraction unit 42, the velocity component extraction unit 43, the acceleration component extraction unit 44, the ideal PCD control value calculation unit 45, and the possible PCD control value calculation unit 46 are provided as the software functional blocks.

Hardware Processing until Start of Audio Reproduction

Figure 10:
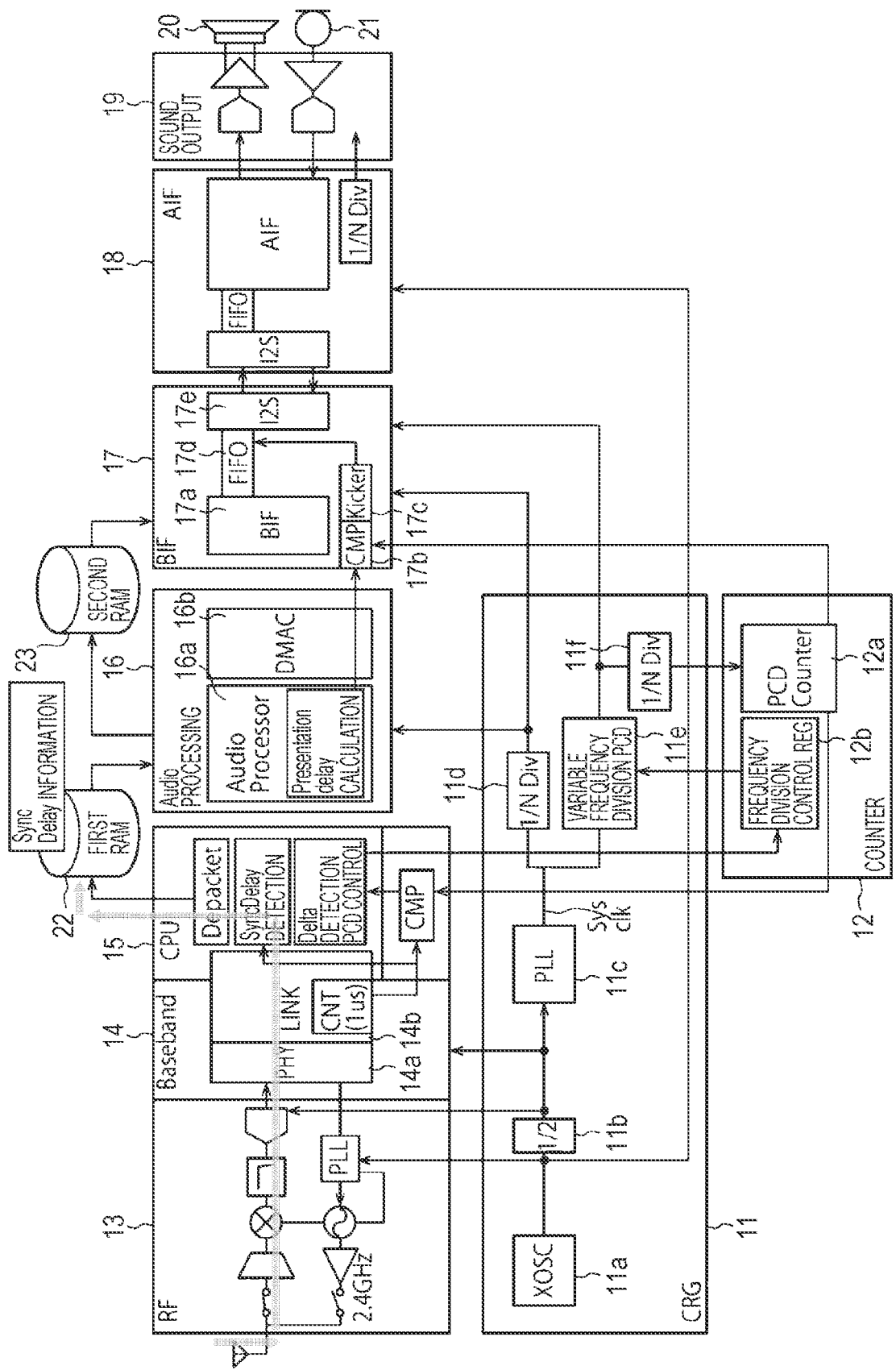
FIG. 10 is a diagram illustrating hardware processing of the slave until the start of audio reproduction by arrow lines.
Figure 11:
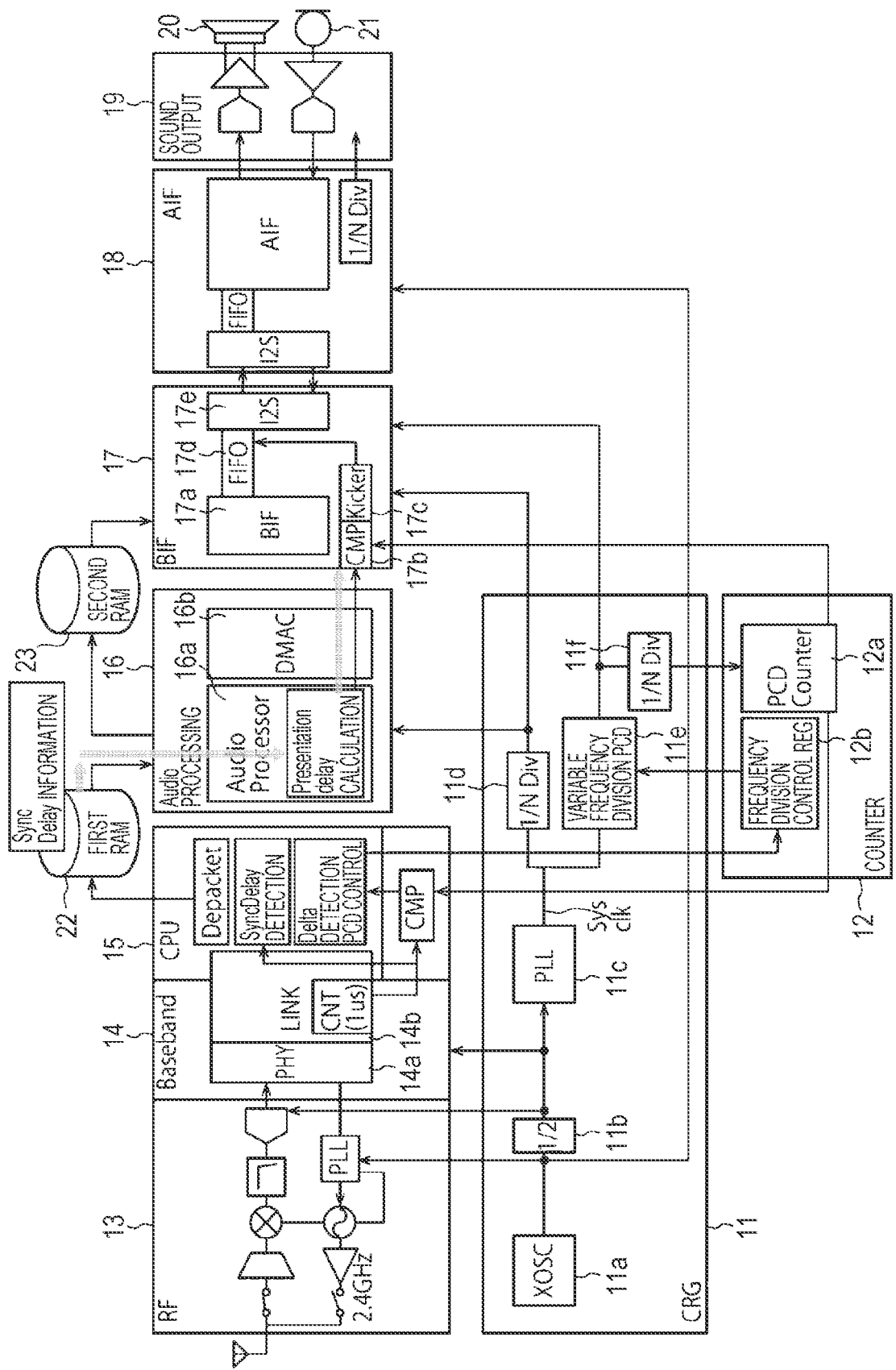
FIG. 11 is a diagram illustrating a procedure subsequent to FIG. 10 by arrow lines.
Figure 12:
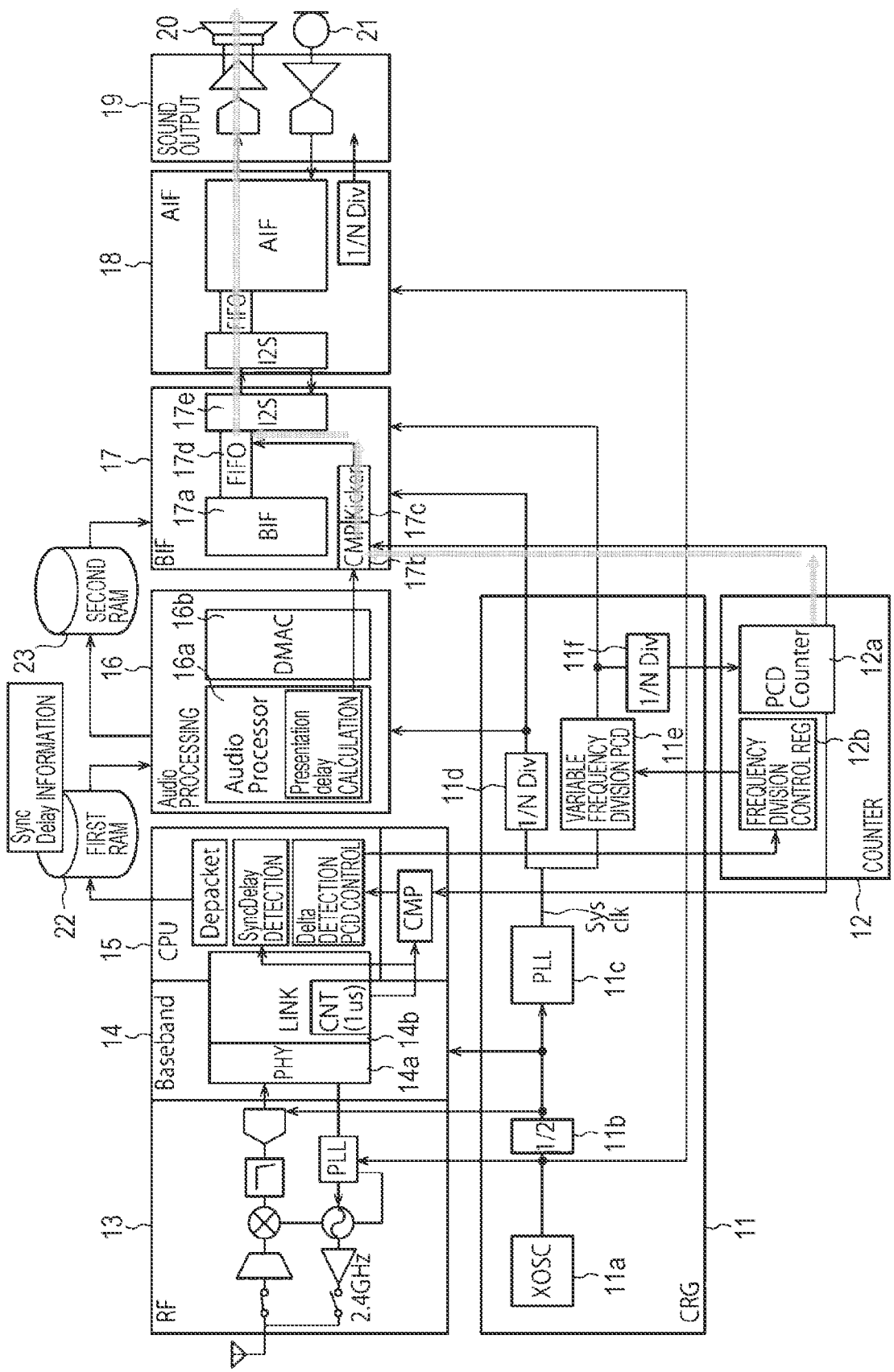
FIG. 12 is a diagram illustrating a procedure subsequent to FIG. 11 by arrow lines.

FIGS. 10 to 12 are diagrams illustrating hardware processing of the slave until the start of audio reproduction by arrow lines. First, as illustrated in FIG. 10, when the right and left earphones 3a and 3b as the slaves S1 and S2 receive packets from the information providing terminal 2 as the master M, demodulation processing is performed by the RF unit 13, a demodulated signal is converted into a digital signal by the PHY unit 14a in the baseband unit 14, and a specific packet is extracted by the LINK unit 14b. Synchronous delay information and audio data included in the extracted packet are stored in the first RAM 22.

Next, as illustrated in FIG. 11, the audio processor 16 calculates presentation delay information from the synchronous delay information. Thereafter, the comparison unit in the BIF 17 determines whether or not the time specified by the presentation delay information has come on the basis of a PCD count value. In a case where it is determined that the time has come, the right and left earphones 3a and 3b start sound output of the audio data as illustrated in FIG. 12.

Figure 13:
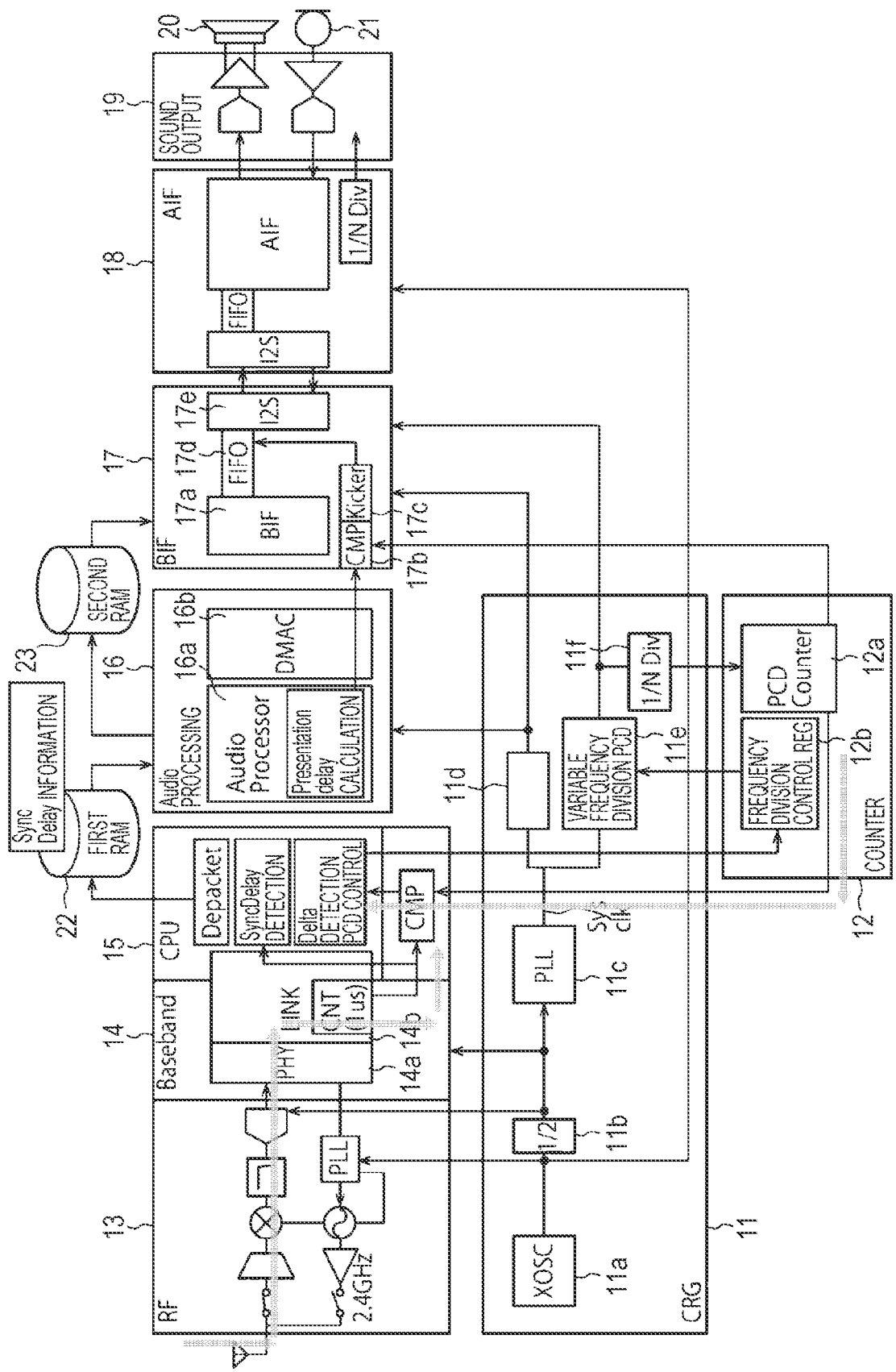
FIG. 13 is a diagram illustrating, by arrow lines, slave hardware processing related to the clock recovery process performed by the left and right earphones as the slaves before sound output is started.
Figure 14:
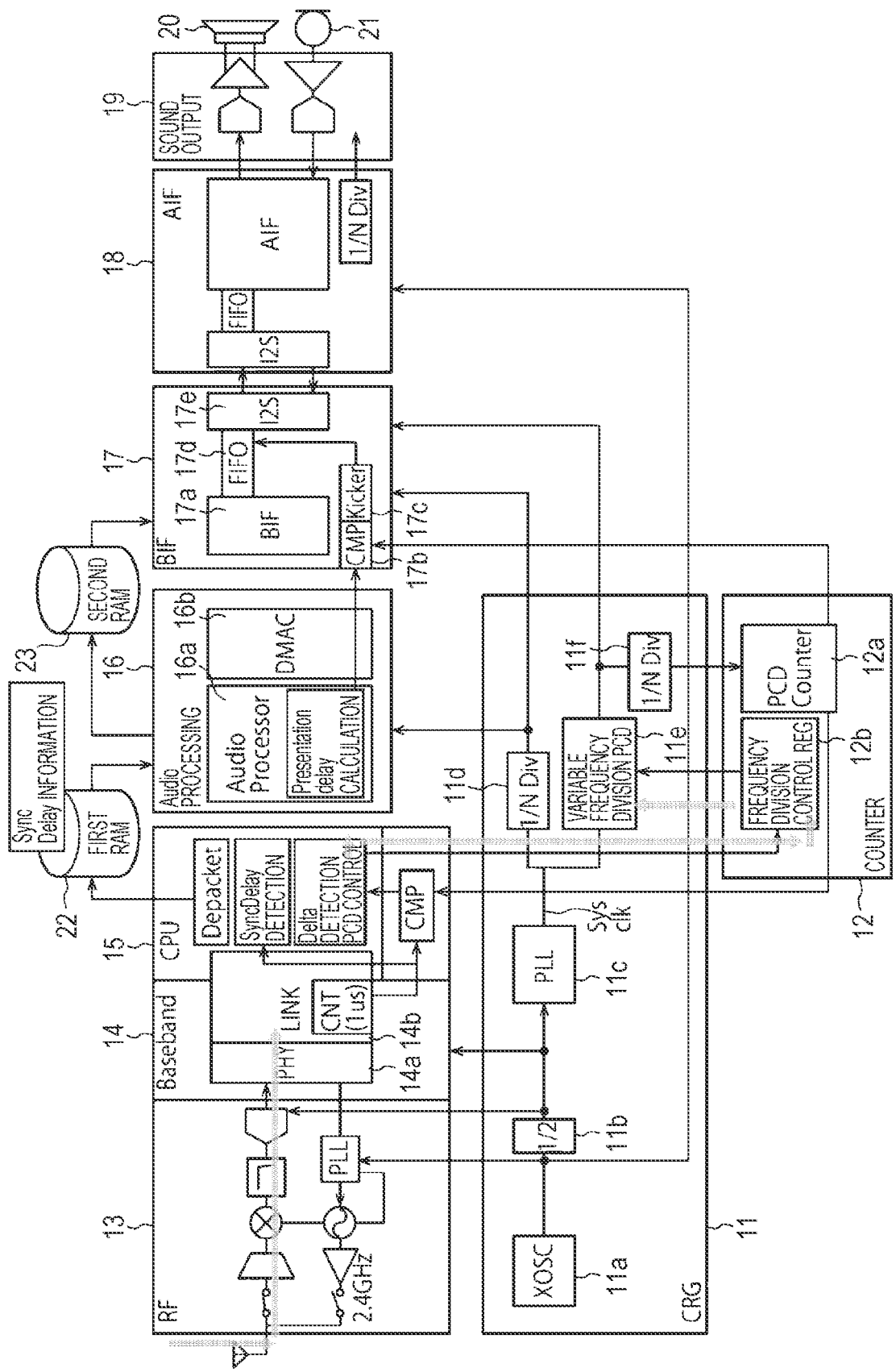
FIG. 14 is a diagram illustrating a procedure subsequent to FIG. 13 by arrow lines.
Figure 15:
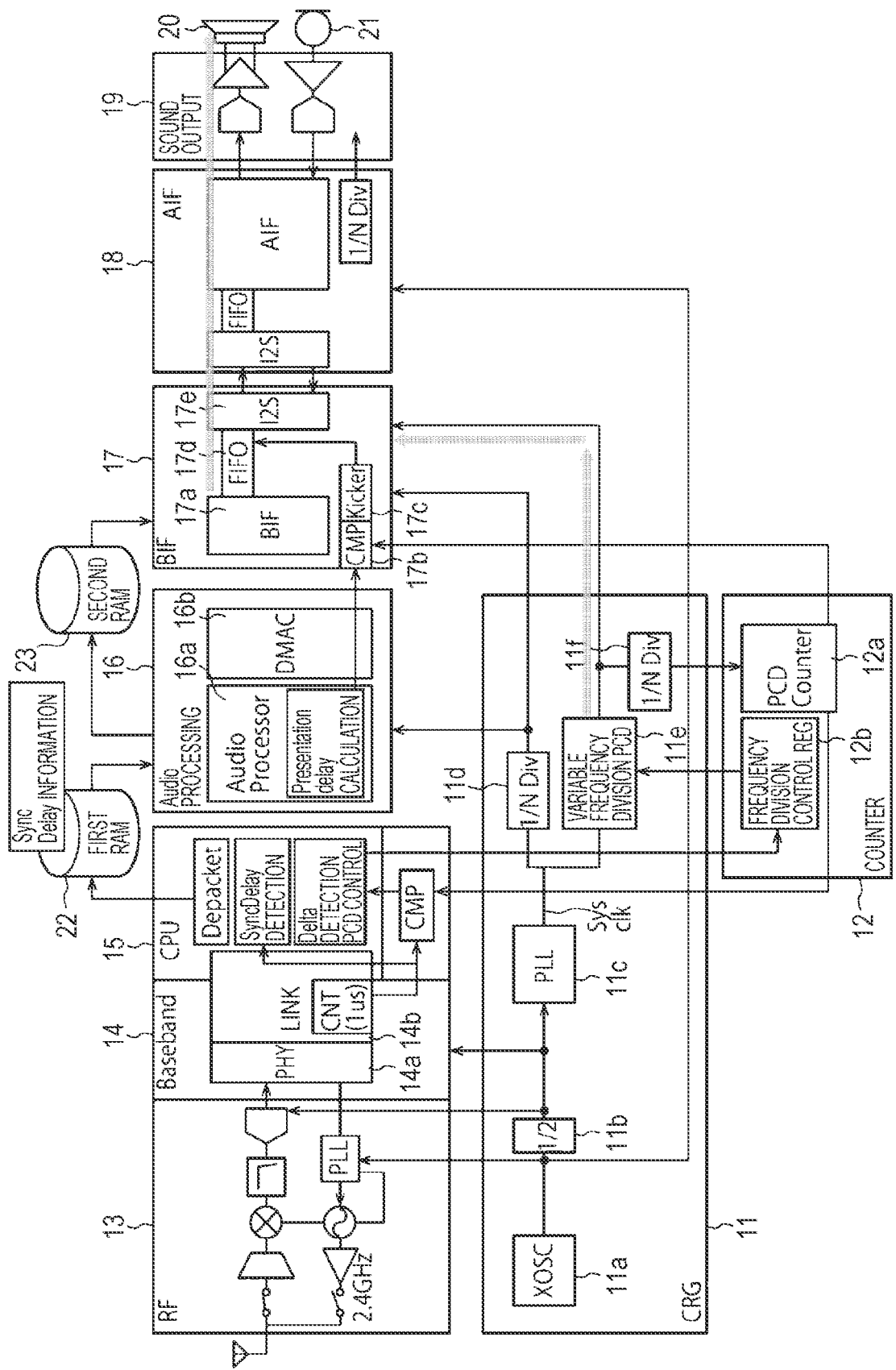
FIG. 15 is a diagram illustrating a procedure subsequent to FIG. 14 by arrow lines.

FIGS. 13 to 15 are diagrams illustrating, by arrow lines, slave hardware processing related to the clock recovery process performed by the right and left earphones 3a and 3b, which are the slaves S1 and S2, before the sound output is started. First, as illustrated in FIG. 13, the PCD counter 12a in the slave counts an interval between packets transmitted from the information providing terminal 2 which is the master M. Furthermore, the LINK unit 14b in the slave extracts the ideal PCD count value included in the BLE parameter included in the received packet. The CPU 15 calculates a difference between the PCD count value and the ideal PCD count value.

Next, as illustrated in FIG. 14, the CPU 15 stores a frequency division control value for controlling a clock of the variable frequency division PCD clock generation unit 11e in the frequency division control register 12b according to the difference between the PCD count value and the ideal PCD count value. The variable frequency division PCD clock generation unit 11e controls a frequency of a frequency-divided clock on the basis of the frequency division control value stored in the frequency division control register 12b. Therefore, the frequency of the reference clock signal for operating the PCD counter 12a is also controlled.

Next, as illustrated in FIG. 15, the comparator in the BIF 17 determines whether or not the sound output timing has come by using the corrected PCD count value.

Figure 16:
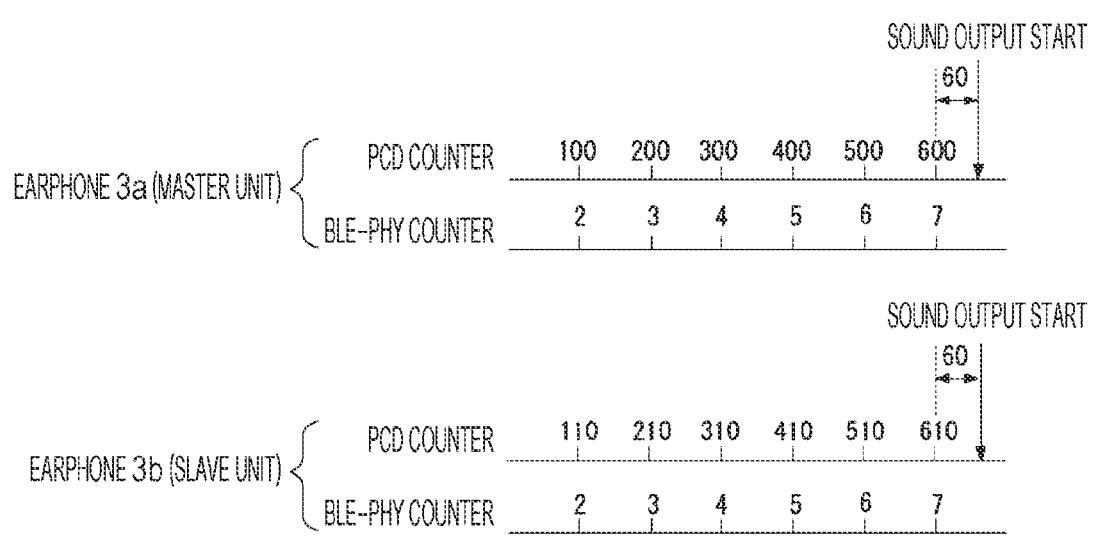
FIG. 16 is a conceptual view of adjustment of sound output timings of the left and right earphones.

When the clock recovery process ends, the sound output timings of the right and left earphones 3a and 3b are adjusted. FIG. 16 is a conceptual view of the adjustment of the sound output timings of the right and left earphones 3a and 3b. In the example of FIG. 16, any one of the left earphone and the right earphone is set as the master M and the other is set as the slave, and a count value (PCD count value) of the PCD counter 12a changes between 100 and 600 while a count value (BLE-PHY count value) of the BLE-PHY counter changes between 2 and 7 in the master M. On the other hand, in the slave, a PCD count value changes between 110 and 610 while a BLE-PHY count value changes between 2 and 7. In this manner, the BLE-PHY count value matches between the master M and the slave. This is because a process of matching the BLE-PHY count value of the slave with the BLE-PHY count value of the master M is performed each time a packet is received. On the other hand, the PCD count values are sometimes different between the master M and the slave. This is because frequencies of source oscillation signals output from the crystal oscillators in the master M and the slave do not necessarily match, and thus, a deviation occurs in the PCD count value.

In the adjustment of the sound output timings of the right and left earphones 3a and 3b, a difference between the PCD count values is detected, and any timing at which the sound output is performed in the right and left earphones 3a and 3b is determined in consideration of the difference. FIG. 16 illustrates an example in which it is determined to perform the sound output when the BLE-PHY count value is 7, and thereafter, the PCD count value is counted up by 60. In this case, a timing when the BLE-PHY count value is 7 and the PCD count value is 660 is the sound output timing of the master M, whereas a timing when the BLE-PHY count value is 7 and the PCD count value is 670 is the sound output timing of the slave. In this manner, the difference between the PCD count values of the master M and the slave is detected, and the sound output timings are determined in consideration of the difference, whereby the sound output timings of the right and left earphones 3a and 3b can be matched.

FIGS. 17 to 20 are diagrams illustrating, by arrow lines, slave hardware processing related to the adjustment of the sound output timings of the right and left earphones 3a and 3b. As illustrated in FIGS. 17 to 20, the CPU 15 of the slave performs a process of generating an LR synchronization packet and a process of generating an LR communication reproduction delay value. Furthermore, the audio processor 16 performs a reproduction delay process for determining a reproduction timing and a mix processing in consideration of the reproduction delay value.

Figure 17:
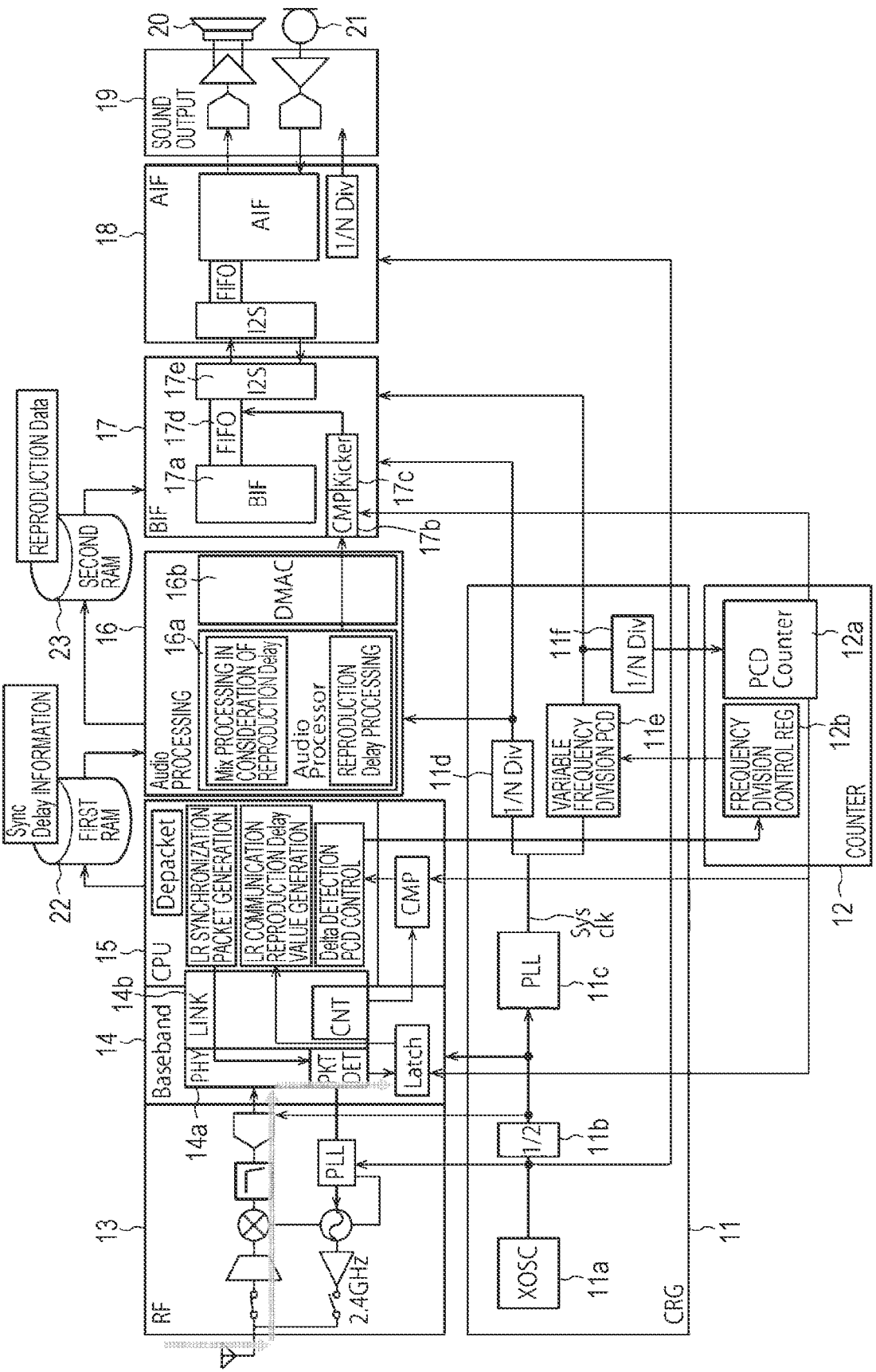
FIG. 17 is a diagram illustrating, by arrow lines, slave hardware processing related to the adjustment of the sound output timings of the left and right earphones.
Figure 18:
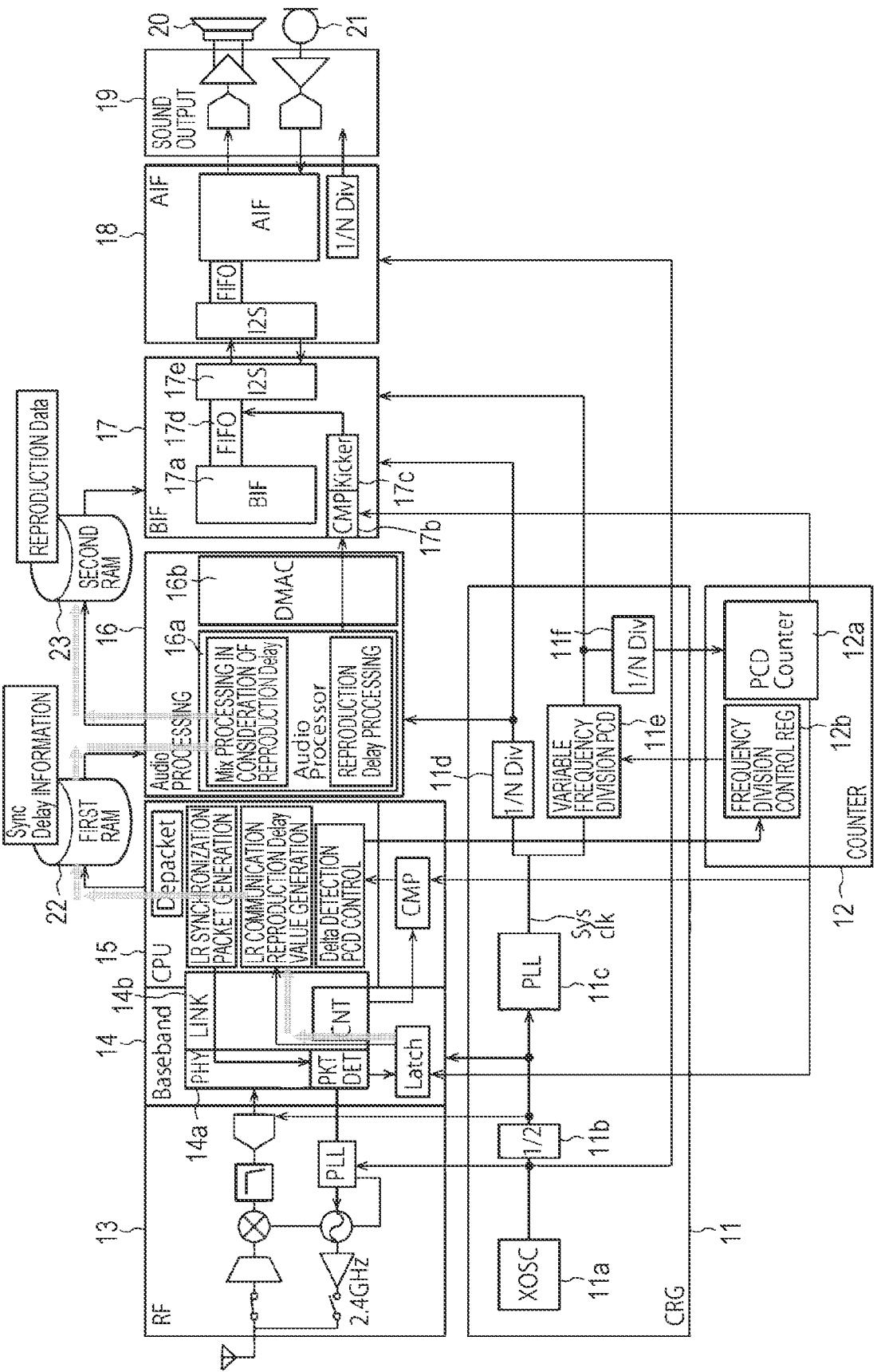
FIG. 18 is a diagram illustrating a procedure subsequent to FIG. 17 by arrow lines.

In FIGS. 17 to 20, for example, the left earphone 3b is set as the master M, and the right earphone 3a is set as the slave. As illustrated in FIG. 17, if a specific packet is received by the right earphone 3a, a BLE-PHY count value and a PCD count value of the left earphone 3b are acquired. Then, as illustrated in FIG. 18, the CPU 15 calculates a reproduction delay value, which is a difference between the PCD count value of the left earphone 3b and a PCD count value of the own device (right earphone 3a), and generates an LR synchronization packet on the basis of the reproduction delay value. The CPU 15 stores the reproduction delay value and the LR synchronization packet in the first RAM 22. The audio processor 16 accesses the first RAM 22, performs the reproduction delay processing and the mix processing on the audio data whose sound needs to be output, and stores the processed audio data in the second RAM 23 via the DMAC 16b.

Figure 19:
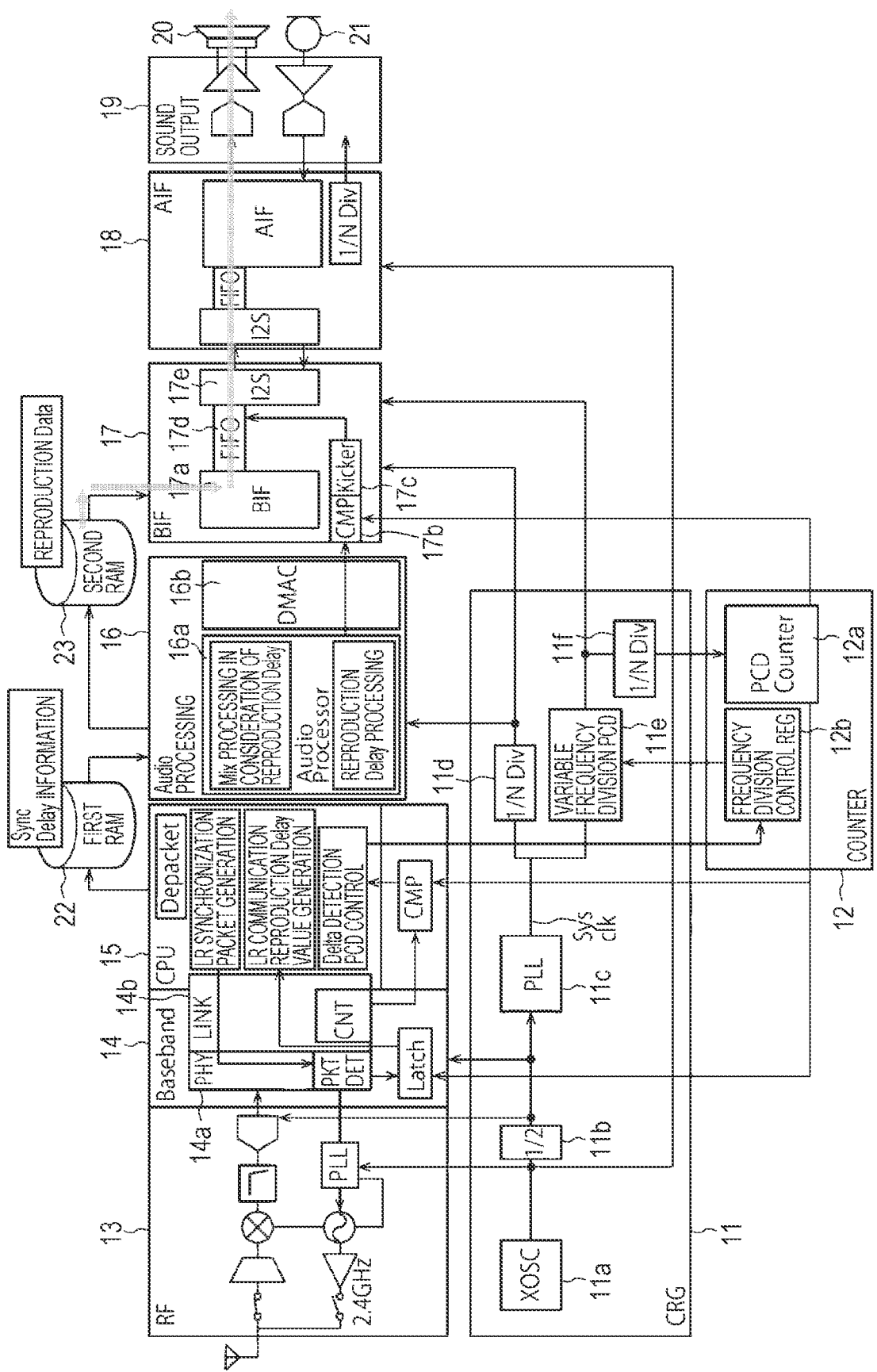
FIG. 19 is a diagram illustrating a procedure subsequent to FIG. 18 by arrow lines.

In a case where the audio data whose sound needs to be output is not audio data provided from the information providing terminal 2 but is a predetermined sound, the sound is transmitted to the AIF 18 and output without being compared with the PCD count value by the BIF 17 as illustrated in FIG. 19.

Figure 20:
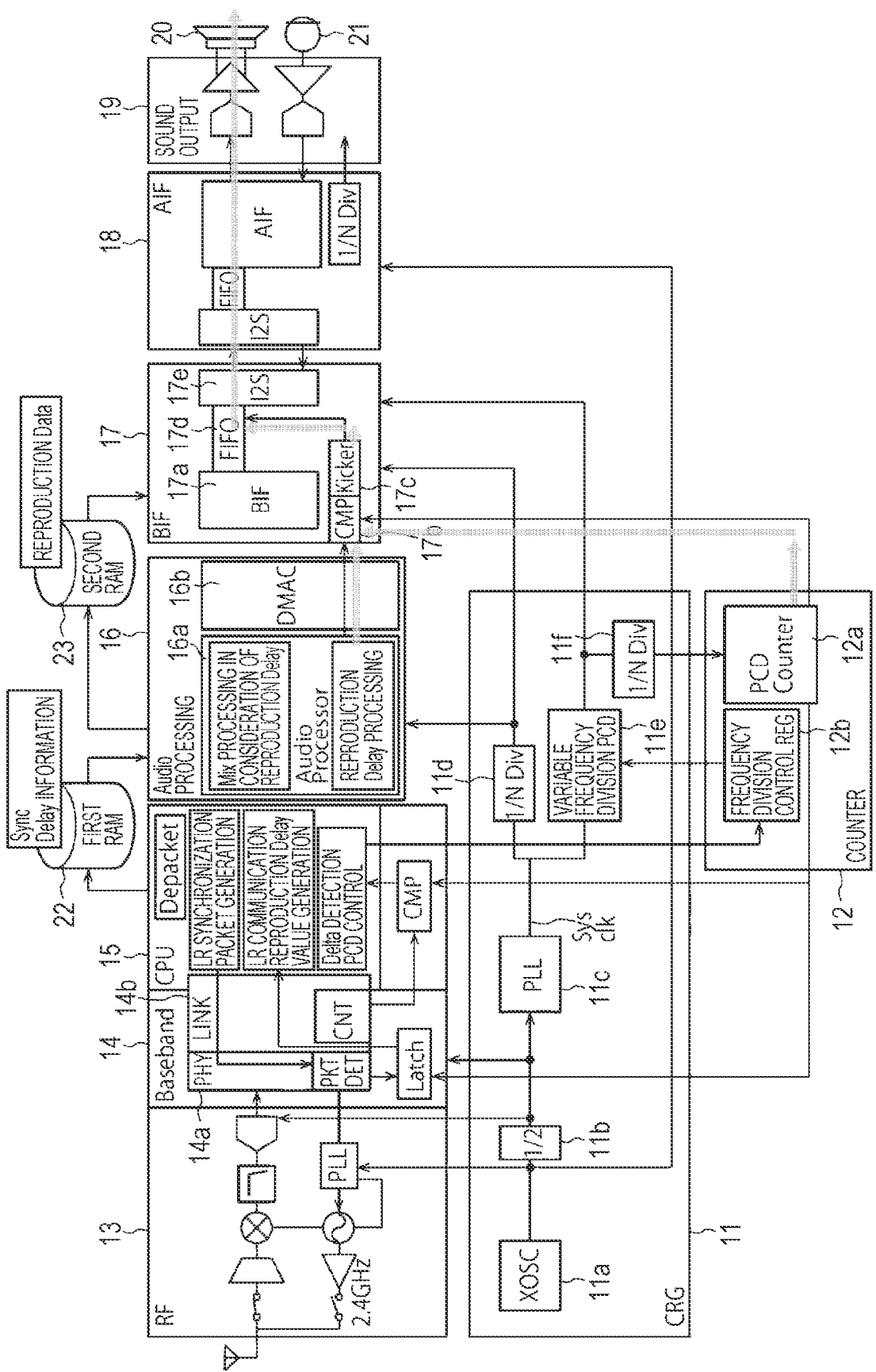
FIG. 20 is a diagram illustrating a procedure subsequent to FIG. 19 by arrow lines.

On the other hand, in a case where the audio data provided from the information providing terminal 2 is to be reproduced, the comparator of the BIF 17 confirms that the PCD count value counted by the PCD counter 12a reaches a scheduled sound reproduction time, and the sound output is started in a case where the PCD count value reaches the scheduled sound reproduction time, as illustrated in FIG. 20.

After the right and left earphones 3a and 3b start the sound output, packet communication is periodically performed between the right and left earphones 3a and 3b to perform the clock recovery process in order to prevent the sound deviation. This clock recovery process is the process of step S35 in FIG. 8. In the clock recovery process performed between the earphones, a PCD count value of the earphone as the master M is sent to the other earphone as the slave. The slave calculates a difference between a PCD count value of the own device and a PCD count value of the master M (step S14 in FIG. 9), adjusts the frequency of the reference clock signal such that the difference becomes zero (step S15), and thereafter, performs phase adjustment of the PCD count values.

Therefore, after the sound output is started from the right and left earphones 3a and 3b, the right and left earphones 3a and 3b can perform the synchronization processing between the right and left earphones 3a and 3b while continuously receiving audio data provided from the information providing terminal 2 as the master M and performing synchronization processing with the information providing terminal 2.

Figure 21:
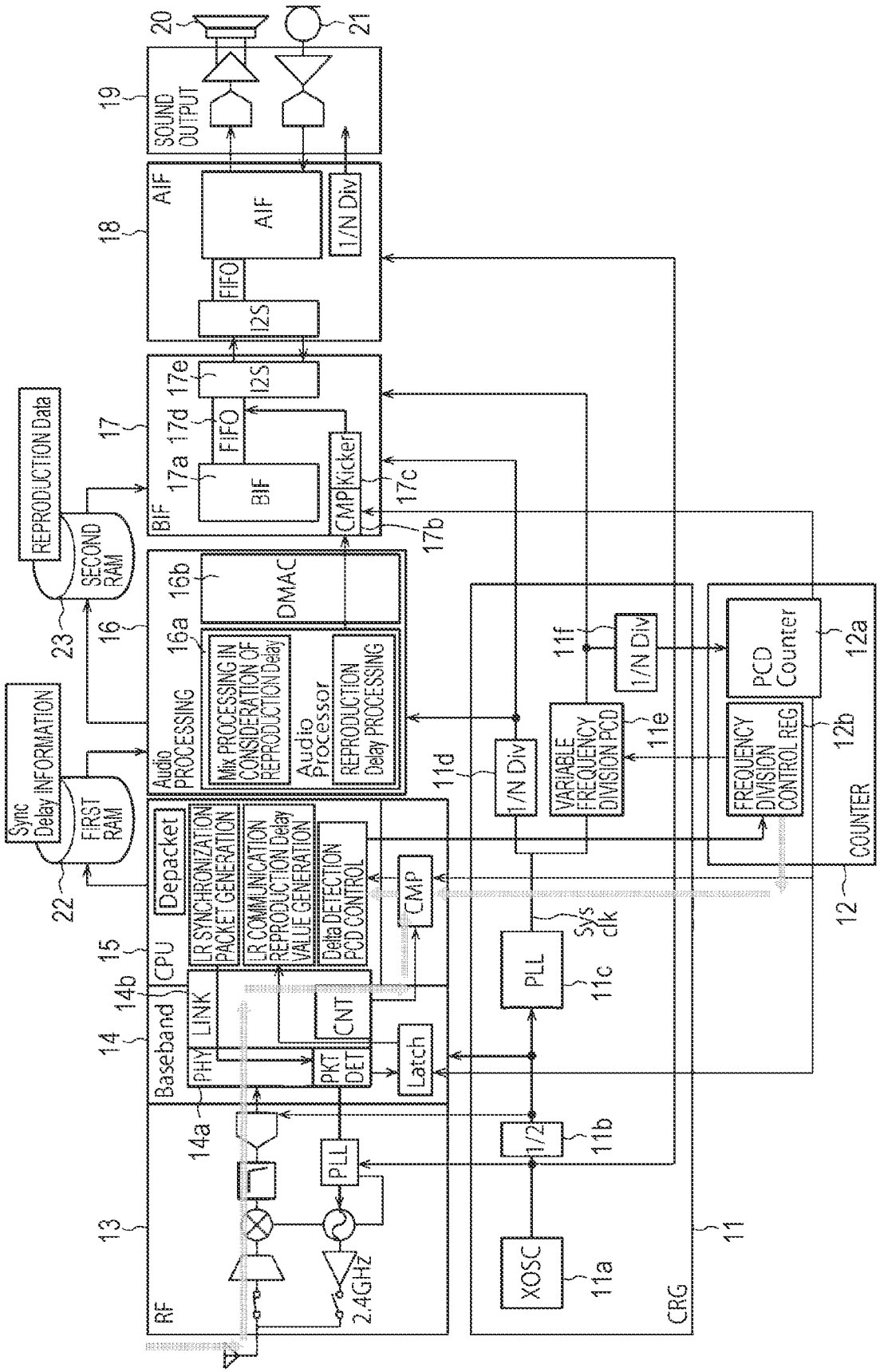
FIG. 21 is a diagram illustrating, by arrow lines, slave hardware processing related to the clock recovery process performed between the left and right earphones.
Figure 22:
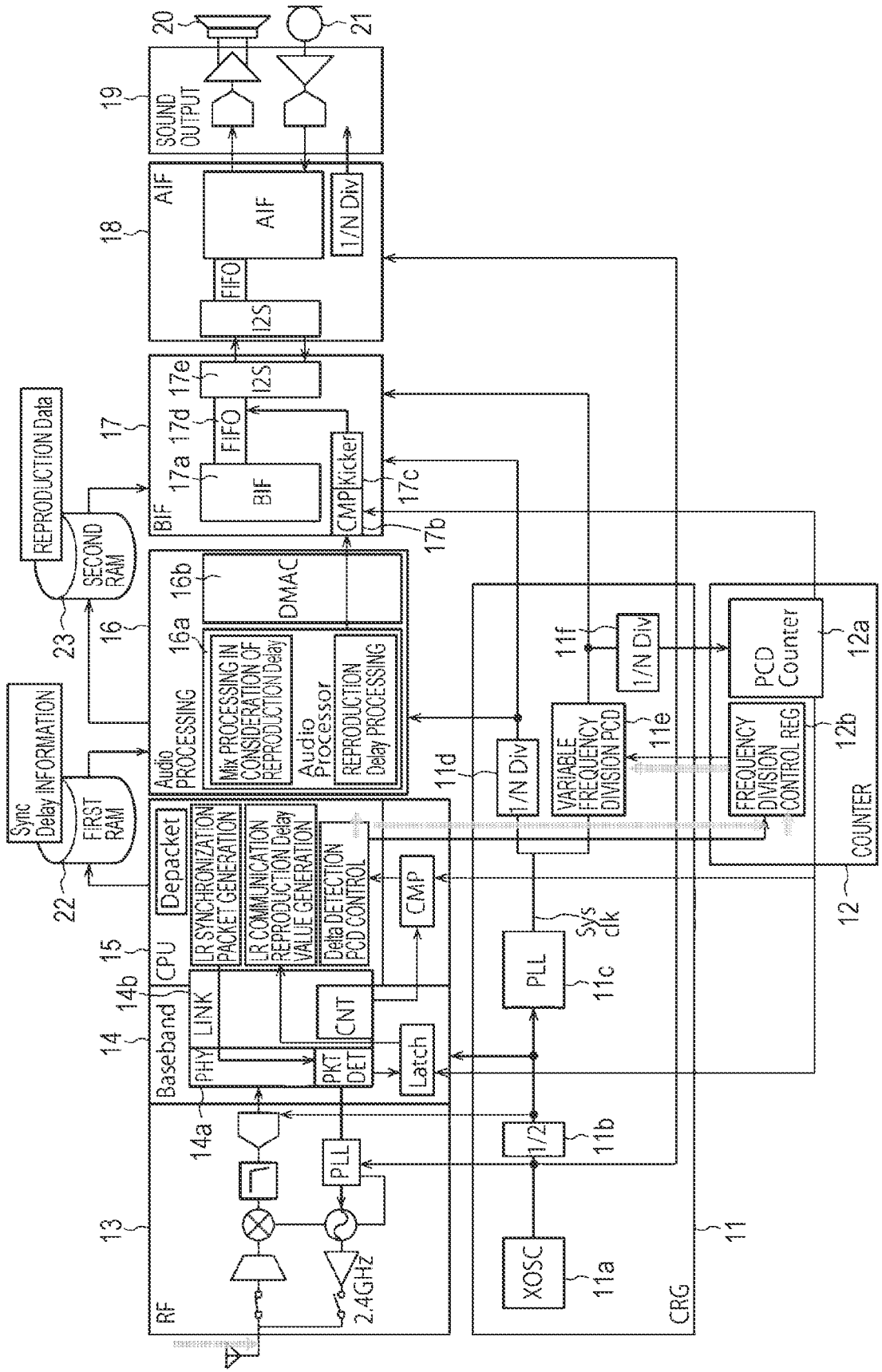
FIG. 22 is a diagram illustrating a procedure subsequent to FIG. 21 by arrow lines.
Figure 23:
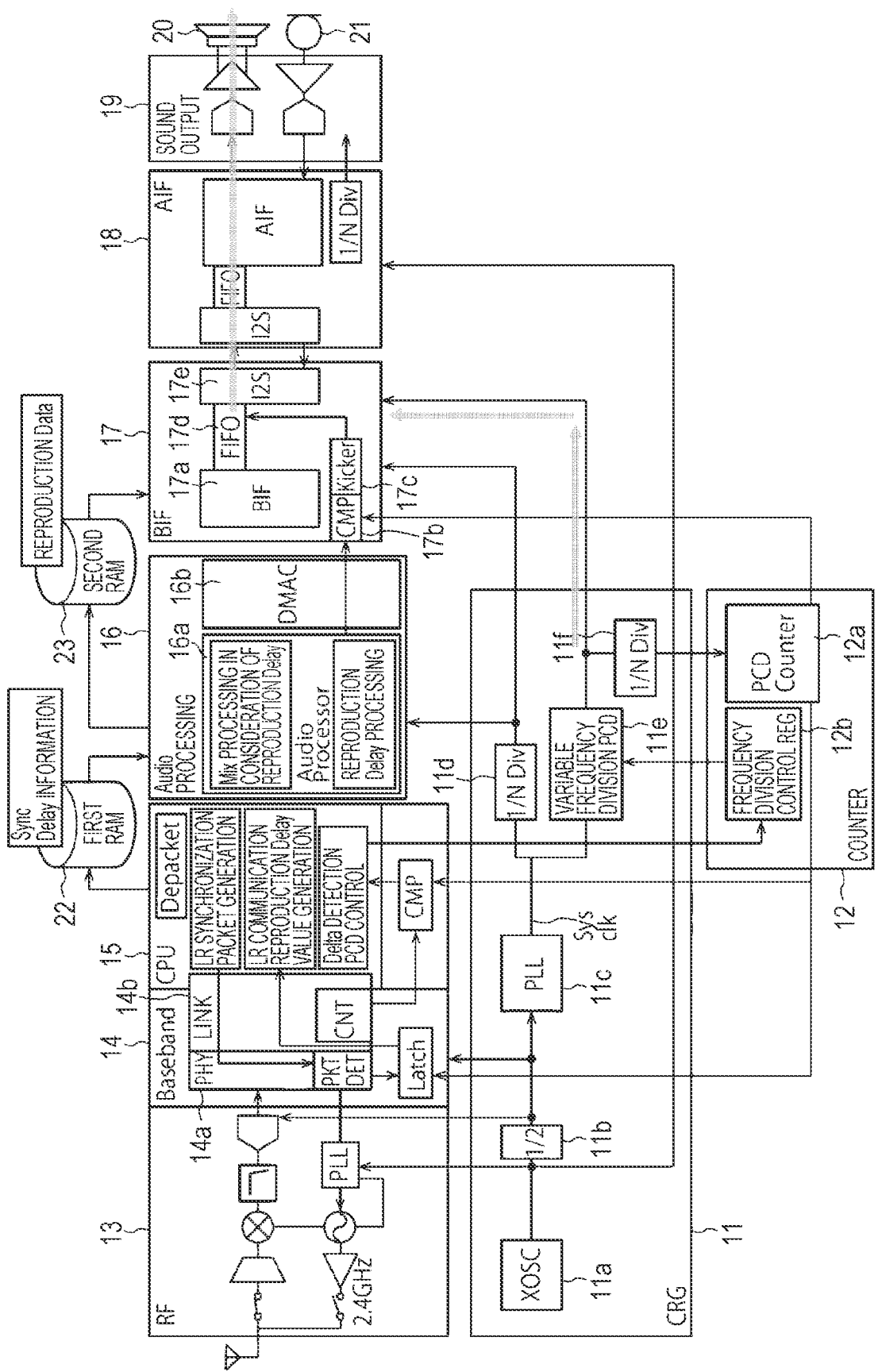
FIG. 23 is a diagram illustrating a procedure subsequent to FIG. 22 by arrow lines.

FIGS. 21 to 23 are diagrams illustrating, by arrow lines, slave hardware processing related to the clock recovery process performed between the right and left earphones 3a and 3b. As illustrated in FIG. 21, the CPU 15 of the slave compares a PCD count value of the master M transmitted from the master M with a PCD count value counted by the PCD counter 12a of the slave. Then, as illustrated in FIG. 22, the CPU 15 calculates a difference between both the PCD count values, and stores a frequency division control value corresponding to the difference in the frequency division control register 12b. The variable frequency division PCD clock generation unit 11e generates a frequency-divided clock signal having a frequency corresponding to the frequency division control value. Next, as illustrated in FIG. 23, a reference clock signal having a frequency corresponding to the difference is generated by the ¼ frequency divider 11f, and a sound output timing is determined in synchronization with the reference clock signal.

In this manner, the slave performs the clock recovery process when the master M and the slave perform the packet communication conforming to the BLE in the present embodiment, and thus, the time-series data can be synchronized between the master M and the slave. In the clock recovery process, in the case where the master M is the information providing terminal 2, the interval of the packet transmitted from the master M is measured by the PCD counter 12a of the slave, the ideal PCD count value is calculated from the BLE parameter included in the packet, and the difference between the PCD count value and the ideal PCD count value is calculated. Since the frequency of the reference clock signal for operating the PCD counter 12a is controlled on the basis of the difference, the PCD count value of the slave can be matched with the PCD count value of the master M, or the difference between the both can be made constant.

The synchronization device according to the present embodiment can adjust the sound output timings of the right and left earphones 3a and 3b after performing such a clock recovery process with the information providing terminal 2, such as a smartphone, as the master M and the right and left earphones 3a and 3b as the slaves. In the adjustment of the sound output timings, the reproduction times of the audio data can be matched between the master M and the slave on the basis of the difference between the PCD count values of the master and the slave.

Furthermore, after the sound output is started once, it is possible to confirm and adjust a deviation in the sound output timing with one earphone as the master M and the other earphone as the slave. Here, the master M and the slave exchange a pair of the BLE-PHY count value and the PCD count value, and the slave, for example, detects the difference between the PCD count values. Then, the sound output timings are adjusted according to the difference. Therefore, even if the PCD count values of the right and left earphones 3a and 3b deviate with a lapse of time, the sound output timings can be matched between the right and left earphones 3a and 3b.

Note that the present technology can have the following configurations.

(1) A synchronization device that synchronizes time-series data between a master and a slave by wireless communication,
the master including a packet transmission unit that transmits a plurality of packets at a predetermined interval, and
the slave including a synchronization unit that synchronizes time-series data transmitted by the master and time-series data received by the slave on the basis of the interval between the plurality of packets.

(2) A synchronization device that synchronizes time-series data by wireless communication between a master and a plurality of slaves,
the master including a packet transmission unit that transmits a plurality of packets at a predetermined interval, and
one of the plurality of slaves including a synchronization unit that synchronizes received time-series data with time-series data transmitted by the master on the basis of the interval between the plurality of packets.

(3) The synchronization device according to claim 1 or 2, in which
the slave includes:
a packet reception unit that receives the plurality of packets; and
a counter that counts an interval of each of the received packets, and
the synchronization unit synchronizes the time-series data transmitted by the master and the time-series data received by the slave on the basis of a count value of the counter.

(4) The synchronization device according to claim 3, in which
the master includes a packet generator that generates the plurality of packets including information regarding the interval of the packet and the time-series data, and
the slave includes a frequency adjustment unit that adjusts a frequency of a reference clock signal of the counter on the basis of the information regarding the interval of the packet received by the packet reception unit.

(5) The synchronization device according to (4), in which
the slave includes:
an interval information extraction unit that extracts the information regarding the interval of the packet from the plurality of packets received by the packet reception unit; and
a difference detection unit that detects a difference between an ideal count value calculated on the basis of the extracted information regarding the interval of the packet and the count value of the counter, and
the frequency adjustment unit adjusts the frequency of the reference clock signal on the basis of the difference.

(6) The synchronization device according to (5), in which the frequency adjustment unit adjusts the frequency of the reference clock signal such that the difference becomes a predetermined value or less.

(7) The synchronization device according to (6), in which
the slave includes:
a clock generator that generates a source clock signal; and
a frequency divider that divides the source clock signal to generate the reference clock signal,
the frequency adjustment unit adjusts the frequency of the reference clock signal by controlling a dividing ratio of the frequency divider on the basis of the difference, and the counter counts the interval of each of the packets in synchronization with the reference clock signal.

(8) The synchronization device according to any one of (4) to (7), in which
the slave includes:
an end time information acquisition unit that acquires information regarding a transmission end time included in the plurality of packets transmitted from the master; and
a start time calculation unit that calculates information regarding a start time of reproduction or processing of the time-series data included in the plurality of packets on the basis of the information regarding the transmission end time, and
the synchronization unit determines a reproduction or processing time of the time-series data included in the plurality of packets on the basis of the calculated information regarding the start time of the reproduction or processing of the time-series data and a count value of the counter after the frequency of the reference clock signal is adjusted by the frequency adjustment unit.

(9) The synchronization device according to (8), in which the slave includes:
a comparator that compares the count value of the counter with the calculated information regarding the start time of the reproduction or processing of the time-series data; and
an instruction unit that instructs the reproduction or processing of the time-series data included in the plurality of received packets when the comparator detects that the count value of the counter has reached the start time.

(10) The synchronization device according to any one of (3) to (9), in which
the packet transmission unit transmits a packet group including the plurality of packets a plurality of times at a predetermined interval,
the counter in the slave measures an interval of each of the packets included in each of the packet groups, and
the synchronization unit synchronizes, for each of the packets included in each of the packet groups, time-series data in the packet with corresponding time-series data in the packet generated by the master.

(11) The synchronization device according to any one of (3) to (9), in which
the packet transmission unit transmits a packet group including the plurality of packets a plurality of times at a predetermined interval,
the counter in the slave measures an interval of each of the packets included in the packet group and measures an interval of the packet group, and
the synchronization unit synchronizes, for each of the packets included in each of the packet groups and for each of the packet groups, time-series data in the packet with corresponding time-series data in the packet generated by the master.

(12) The synchronization device according to any one of (1) to (11), in which the time-series data is data including biological information or audio data.

(13) The synchronization device according to any one of (3) to (11) including
a plurality of the slaves performing wireless communication with the master,
in which the packet reception unit in one of the plurality of slaves performs the wireless communication with the master at different timings to receive the plurality of packets including unique time-series data transmitted from the master.

(14) The synchronization device according to any one of (1) to (12) in which
the master is an information providing terminal including a storage unit that stores audio data,
the plurality of slaves includes two slaves performing wireless communication with the information providing terminal at different timings, and
one of the two slaves is an earphone that reproduces audio data for a left ear, the audio data being transmitted from the master, and another of the two slaves is an earphone that reproduces audio data for a right ear, the audio data being transmitted from the master.

(15) A synchronization device that synchronizes time-series data by wireless communication between a master and a slave,
the master including:
a first detection unit that detects an interval between a plurality of packets received from an information providing terminal by the master; and
a first packet transmission unit that transmits a packet including information regarding the interval detected by the first detection unit to the slave, and
the slave including:
a second detection unit that detects an interval between a plurality of packets received from the information providing terminal by the slave; and
a synchronization unit that synchronizes time-series data received by the master from the information providing terminal and time-series data received by the slave from the information providing terminal on the basis of the interval detected by the second detection unit and the interval detected by the first detection unit.

(16) The synchronization device according to (15), in which
the first detection unit includes:
a first counter that performs a counting operation in synchronization with a first reference clock signal; and
a second counter that counts the interval between the plurality of packets transmitted from the information providing terminal in synchronization with the second reference clock signal, and
the second detection unit includes:
a third counter that performs a counting operation in synchronization with a third reference clock signal; and
a fourth counter that counts the interval between the plurality of packets transmitted from the information providing terminal in synchronization with a fourth reference clock signal.

(17) The synchronization device according to (16), in which the synchronization unit synchronizes time-series data in a packet received from the information providing terminal by the slave with corresponding time-series data in a packet received from the information providing terminal by the master on the basis of a count value of the first counter, a count value of the second counter, a count value of the third counter, and a count value of the fourth counter.

(18) The synchronization device according to (16), in which the slave includes a second packet transmission unit that transmits a packet including a count value of the third counter and a count value of the fourth counter to the master.

(19) The synchronization device according to any one of (16) to (18), in which the slave adjusts a frequency and a phase of the fourth reference clock signal on the basis of a count value of the second counter transmitted from the master.

(20) The synchronization device according to (19), in which
the slave includes:
a difference calculation unit that calculates a difference between the count value of the second counter transmitted from the master and a count value of the fourth counter; and
a frequency adjustment unit that adjusts a frequency of the fourth reference clock signal on the basis of the difference.

(21) The synchronization device according to (20), in which
the slave includes
a start time calculation unit that calculates information regarding a start time of reproduction or processing of time-series data on the basis of information regarding a transmission end time included in a plurality of packets transmitted from the information providing terminal, and
the synchronization unit synchronizes a time at which the reproduction or processing of the time-series data is to be performed with the master on the basis of a count value of the third counter, a count value of the fourth counter after the frequency of the fourth reference clock signal is adjusted by the frequency adjustment unit, the difference calculated by the difference calculation unit after the frequency of the fourth reference clock signal is adjusted by the frequency adjustment unit, and the information regarding the start time.

(22) The synchronization device according to (21), in which
the frequency adjustment unit adjusts the frequency of the fourth reference clock signal on the basis of the difference when the master and the slave start packet communication, and
the synchronization unit synchronizes the time at which the reproduction or processing of the time-series data is to be performed with the master while the master and the slave perform the packet communication with the information providing terminal.

(23) The synchronization device according to (18), in which
the slave includes:
a fifth counter that counts a delimiter of reproduced or processed time-series data; and
a count value acquisition unit that acquires a count value of the third counter and a count value of the fourth counter each time the fifth counter counts up, and
the second packet transmission unit transmits the count value of the third counter and the count value of the fourth counter acquired by the count value acquisition unit to the master.

(24) The synchronization device according to (23), in which
the time-series data is audio data, and
the fifth counter counts a number of frames of the audio data.

(25) The synchronization device according to any one of (15) to (24), in which one of the master and the slave is a first earphone that receives audio data for a left ear from the information providing terminal, and another of the master and the slave is a second earphone that receives audio data for a right ear from the information providing terminal at a different timing different from the first earphone.

(26) The synchronization device according to any one of (1) to (25), in which the master and the slave perform packet communication conforming to a Bluetooth (registered trademark) low energy standard.

(27) A synchronization method for synchronizing time-series data by wireless communication between a master and a slave, the synchronization method including:
transmitting, by the master, a plurality of packets at a predetermined interval; and
synchronizing, by the slave, time-series data transmitted by the master and time-series data received by the slave on the basis of the interval between the plurality of packets.

Aspects of the present disclosure are not limited to the above-described respective embodiments, but include various modifications that can be conceived by those skilled in the art, and effects of the present disclosure are not limited to the above-described contents. That is, various additions, changes, and partial deletions can be made within a scope not departing from a conceptual idea and a spirit of the present disclosure derived from the contents defined in the claims and equivalents thereof.

REFERENCE SIGNS LIST

1 Synchronization device
2 Information providing terminal
3a, 3b Earphone
11 Clock generation unit
11a Crystal oscillator
11b ½ frequency divider
11c PLL circuit
11d 1/N frequency divider
11e Variable frequency division PCD clock generation unit
11f ¼ frequency divider
12 Counter unit
12a PCD counter
13 RF unit
14 Baseband unit
14a PHY unit
14b LINK unit
15 CPU
16 Audio processor
16a DSP
16b DMAC
17 BIF
17a BIF unit
17b Comparator
17c Trigger generator
17d FIFO
17e I2S communication unit
18 AIF
19 Audio chip
20 Speaker
21 Microphone
31 BLE-PCD counter pair acquisition unit
32 Left-right PCD deviation calculation unit
33 Output PCD calculation unit
34 Presentation delay calculation unit
35 Audio decoder
36 Audio frame counter
37 Audio PCD counter pair acquisition unit
38 Fall-off/wrap-around detection unit
39 Out-of-tolerance data removal unit
40 BLE parameter extraction unit
41 Ideal PCD value calculation unit 42 PCD difference extraction unit
43 Velocity component extraction unit
44 Acceleration component extraction unit
45 Ideal PCD control value calculation unit
46 Possible PCD control value calculation unit

The invention claimed is:
1. A synchronization device, comprising:
a master including a packet transmission unit, wherein
the packet transmission unit is configured to transmit plurality of packets at a first interval, and
each packet of the plurality of packets includes each of information associated with the first interval and time-series data; and
at least one slave including:
a packet reception unit configured to receive the plurality of packets;
an interval information extraction unit configured to:
extract, from each packet of the received plurality of packets, the information associated with the first interval; and
calculate a first count value based on the extracted information associated with the first interval;
a counter configured to count a second interval between each packet of the received plurality of packets based on a frequency of a reference clock signal of the counter;
a difference detection unit configured to detect a difference between the first count value and a second count value of the counter; and
a synchronization unit configured to synchronize, based on the difference between the first count value and the second count value of the counter, the time-series data transmitted by the master and time-series data received by the at least one slave.

2. The synchronization device according to claim 1, wherein
the master further includes a packet generator configured to generate the plurality of packets, and
the at least one slave further includes a frequency adjustment unit configured to adjust the frequency of the reference clock signal of the counter based on the information associated with the first interval.

3. The synchronization device according to claim 2, wherein the at least one slave further includes:
a clock generator configured to generate a source clock signal; and
a frequency divider configured to:
divide the source clock signal; and
generate the reference clock signal based on the division of the source clock signal,
the frequency adjustment unit is further configured to:
control a dividing ratio of the frequency divider based on the difference between the calculated first count value and the second count value of the counter; and
adjust the frequency of the reference clock signal based on the control of the dividing ratio of the frequency divider,
based on the adjustment of the frequency of the reference clock signal, the counter is further configured to count a third interval, between each packet of the received plurality of packets, in synchronization with the adjusted frequency of the reference clock signal, and the count of the third interval corresponds to a third count value of the counter.

4. The synchronization device according to claim 2, wherein based on the adjustment of the frequency of the reference clock signal, the difference between the first count value and the second count value of the counter becomes one of a constant value or zero.

5. The synchronization device according to claim 4, wherein the at least one slave further includes:
a clock generator configured to generate a source clock signal; and
a frequency divider configured to:
divide the source clock signal; and
generate the reference clock signal based on the division of the source clock signal,
the frequency adjustment unit is further configured to:
control a dividing ratio of the frequency divider based on the difference between the calculated first count value and the second count value of the counter; and
adjust the frequency of the reference clock signal based on the control of the dividing ratio of the frequency divider,
based on the adjustment of the frequency of the reference clock signal, the counter is further configured to
count a third interval, between each packet of the received plurality of packets, in synchronization with the adjusted frequency of the reference clock signal, and
the count of the third interval corresponds to a third count value of the counter.

6. The synchronization device according to claim 5, wherein the at least one slave further includes:
an end time information acquisition unit configured to acquire information associated with a transmission end time, wherein each packet of the plurality of packets further includes the transmission end time; and
a start time calculation unit configured to calculate information associated with a start time of reproduction of the time-series data included in each packet of the received plurality of packets,
wherein the calculation of the information associated with the start time of reproduction is based on the information associated with the transmission end time, and
the synchronization unit is further configured to determine a reproduction time of the time-series data included in each packet of the received plurality of packets based on each of:
the calculated information associated with the start time of reproduction, and
the third count value of the counter.

7. The synchronization device according to claim 6, wherein the at least one slave further includes:
a comparator configured to:
compare the third count value of the counter with the calculated information associated with the start time of reproduction; and
determine the third count value of the counter is equal to the start time of reproduction; and
an instruction unit configured to instruct, based on the determination that the third count value is equal to the start time of reproduction, a reproduction of the time-series data included in each packet of the received plurality of packets.

8. The synchronization device according to claim 2, wherein
the packet transmission unit is further configured to transmit a plurality of packet groups at a specific interval, each packet group of the plurality of packet groups includes the plurality of packets at a plurality of times,
the counter is further configured to count a fourth interval of each packet of the plurality of packets, and
the synchronization unit is further configured to synchronize, for each packet of the plurality of packets, the time-series data included in each packet of the received plurality of packets with the time-series data in each packet of the plurality of packets generated by the master.

9. The synchronization device according to claim 1, further comprising a plurality of slaves configured to wirelessly communicate with the master, wherein
the plurality of slaves includes the at least one slave, and
the packet reception unit in the at least one slave of the plurality of slaves is further configured to wirelessly communicate with the master at different timings to receive the plurality of packets.

10. The synchronization device according to claim 1, wherein the time-series data includes at least one of biological information or audio data.

11. The synchronization device according to claim 1, further comprising a plurality of slaves configured to wirelessly communicate with the master, wherein
the plurality of slaves includes the at least one slave,
the packet reception unit in the at least one slave of the plurality of slaves is further configured to wirelessly communicate with the master at different timings to receive the plurality of packets.

12. A synchronization device, comprising:
a master including a packet transmission unit, wherein
the packet transmission unit is configured to transmit a plurality of packets at a first interval, and
each packet of the plurality of packets includes information associated with the first interval and time-series data; and
a plurality of slaves, wherein at least one slave of the plurality of slaves includes:
a packet reception unit configured to receive the plurality of packets;
an interval information extraction unit configured to:
extract, from each packet of the received plurality of packets, the information associated with the first interval; and
calculate a first count value based on the extracted information associated with the first interval;
a counter configured to count a second interval, between each packet of the received plurality of packets, based on a frequency of a reference clock signal of the counter;
a difference detection unit configured to detect a difference between the calculated first count value and a second count value of the counter; and
a synchronization unit configured to synchronize, based on the difference between the calculated first count value and the second count value of the counter, the time-series data transmitted by the master and time-series data received by the at least one slave of the plurality of slaves.

13. The synchronization device according to claim 1, wherein each of the master and the at least one slave is configured to execute packet communication that conforms to a Bluetooth (registered trademark) low energy standard.

14. A synchronization device, comprising:
a master including a packet transmission unit, wherein
the packet transmission unit is configured to transmit a plurality of packets at a first interval, and
each packet of the plurality of packets includes information associated with the first interval and time-series data; and
a plurality of slaves, wherein at least one slave of the plurality of slaves includes:
a packet reception unit configured to receive the plurality of packets;
an interval information extraction unit configured to:
extract, from each packet of the received plurality of packets, the information associated with the first interval; and
calculate a first count value based on the extracted information associated with the first interval;
a counter configured to count a second interval, between each packet of the received plurality of packets, based on a frequency of a reference clock signal of the counter; and
a difference detection unit configured to detect a difference between the calculated first count value and a second count value of the counter; and
a synchronization unit configured to synchronize, based on the difference between the calculated first count value and the second count value of the counter, the time-series data transmitted by the master and time-series data received by the at least one slave of the plurality of slaves.

15. A synchronization device, comprising:
a master including:
a first packet reception unit configured to receive a first plurality of packets from an information providing terminal, wherein each packet of the first plurality of packets comprises first time-series data;
a first detection unit comprising:
a first counter configured to count in synchronization with a first reference clock signal; and
a second counter configured to detect a first interval between the first plurality of packets in synchronization with a second reference clock signal; and
a first packet transmission unit configured to transmit a specific packet including information associated with the first interval; and
at least one slave including:
a second packet reception unit configured to receive a second plurality of packets from the information providing terminal, wherein each packet of the second plurality of packets comprises second time-series data;
a second detection unit comprising:
a third counter configured to count in synchronization with a third reference clock signal; and
a fourth counter configured to detect a second interval between the second plurality of packets in synchronization with a fourth reference clock signal; and
a synchronization unit configured to synchronize, the first time-series data received by the master and the second time-series data received by the at least one slave, based on the first interval and the second interval.

16. The synchronization device according to claim 15, wherein the synchronization unit is further configured to synchronize the second time-series data with the first time-series data based on each of a count value of the first counter, a count value of the second counter, a count value of the third counter, and a count value of the fourth counter.

17. The synchronization device according to claim 16, wherein
the at least one slave further includes:

a fifth counter configured to count a delimiter of reproduced time-series data; and a count value acquisition unit configured to acquire, each time the fifth counter counts, the count value of the third counter and the count value of the fourth counter, and the second packet transmission unit is further configured to transmit, to the master, the count value of the third counter and the count value of the fourth counter.

18. The synchronization device according to claim 17, wherein the at least one slave further includes:

a fifth counter configured to count a delimiter of reproduced time-series data; and a count value acquisition unit configured to acquire, each time the fifth counter counts, the count value of the third counter and the count value of the fourth counter, and wherein the second packet transmission unit is further configured to transmit, to the master, the count value of the third counter and the count value of the fourth counter.

19. The synchronization device according to claim 18, wherein the reproduced time-series data is audio data, and the fifth counter is further configured to count a number of frames of the audio data.

20. The synchronization device according to claim 15, wherein the specific packet, transmitted by the master, further includes a count value of the second counter, and the at least one slave is further configured to adjust each of a frequency and a phase of the fourth reference clock signal based on the count value of the second counter.

21. The synchronization device according to claim 20, wherein the at least one slave further includes:

a difference calculation unit configured to calculate a first difference between the count value of the second counter and a first count value of the fourth counter; and a frequency adjustment unit configured to adjust the frequency of the fourth reference clock signal based on the first difference.

22. The synchronization device according to claim 21, wherein based on the adjustment of the frequency of the fourth reference clock signal, the fourth counter is further configured to:

count a third interval between the second plurality of packets; and the count of the third interval corresponds to a second count value of the fourth counter, and the difference calculation unit is further configured to determine a second difference between the count value of the second counter and the second count value of the fourth counter, the at least one slave further includes a start time calculation unit configured to calculate information associated with a start time of reproduction of the second time-series data based on information associated with a transmission end time, the second a plurality of packets includes the information associated with the transmission end time, and the synchronization unit is further configured to synchronize a time, at which a reproduction of the second time-series data starts, with the master based on each of a count value of the third counter, the second count value of the fourth counter, the second difference, and the information associated with the start time of reproduction.

23. The synchronization device according to claim 22, wherein based on the adjustment of the frequency of the fourth reference clock signal, the fourth counter is further configured to count a third interval between the second plurality of packets, wherein the count of the third interval corresponds to a second count value of the fourth counter, and the difference calculation unit is further configured to determine a second difference between the count value of the second counter and the second count value of the fourth counter, the at least one slave further includes a start time calculation unit configured to calculate information associated with a start time of reproduction of the second time-series data based on information associated with a transmission end time, the second plurality of packets includes the information associated with the transmission end time, and the synchronization unit is further configured to synchronize a time, at which a reproduction of the second time-series data starts, with the master based on each of a count value of the third counter, the second count value of the fourth counter, the second difference, and the information associated with the start time of reproduction.

24. The synchronization device according to claim 15, wherein the master is a first earphone configured to receive audio data, for a left ear, from the information providing terminal at a first timing, and the at least one slave is a second earphone configured to receive the audio data, for a right ear, from the information providing terminal at a second timing different from the first timing.

25. A synchronization method, comprising:

transmitting, by a packet transmission unit of a master, a plurality of packets at a first interval, wherein each packet of the plurality of packets includes each of information associated with the first interval and time-series data;

receiving, by a packet reception unit of a slave, the plurality of packets;

extracting, by an interval information extraction of the slave, the information associated with the first interval from each packet of the received plurality of packets;

calculating, by the interval information extraction, a first count value based on the extracted information associated with the first interval;

counting, by a counter of the slave, a second interval between each packet of the received plurality of packets based on a frequency of a reference clock signal of the counter;

detecting, by a difference detection unit of the slave, a difference between the first count value and a second count value of the counter; and synchronizing, by a synchronization unit of the slave, the time-series data transmitted by the master and time-series data received by the slave, wherein the synchronization is based on the difference between the first count value and the second count value of the counter.

* * * * *